(12) United States Patent
Hoover et al.

(10) Patent No.: US 10,299,553 B1
(45) Date of Patent: May 28, 2019

(54) FEATURES OF A CAMERA OPENING AND BUTTONS FOR AN ACCESSORY CASE OF AN ELECTRONIC DEVICE

(71) Applicant: Apple Inc., Cupertino, CA (US)

(72) Inventors: Joshua A. Hoover, San Francisco, CA (US); Jeremy C. Franklin, San Francisco, CA (US); Chad J. Miller, San Francisco, CA (US); Candace A. Marbury, San Jose, CA (US); Heidi Williamson, San Francisco, CA (US); Kristine S. Tom, Santa Clara, CA (US); Michael B. Velez, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/623,212

(22) Filed: Jun. 14, 2017

Related U.S. Application Data

(60) Provisional application No. 62/384,182, filed on Sep. 6, 2016.

(51) Int. Cl.
*A45C 11/00* (2006.01)
*A45C 11/38* (2006.01)
*A45C 13/00* (2006.01)

(52) U.S. Cl.
CPC .............. *A45C 11/00* (2013.01); *A45C 11/38* (2013.01); *A45C 13/002* (2013.01); *A45C 2011/001* (2013.01); *A45C 2011/002* (2013.01); *A45C 2011/003* (2013.01)

(58) Field of Classification Search
CPC . G03B 17/568; A45C 2011/002; A45C 11/00; A45C 11/38; A45C 13/02
See application file for complete search history.

(56) References Cited

U.S. PATENT DOCUMENTS

| | | | |
|---|---|---|---|
| 8,442,604 B1 | 5/2013 | Diebel | |
| 9,480,319 B2 * | 11/2016 | Dining | ................... A45C 11/00 |
| 9,545,140 B1 * | 1/2017 | Johnson | ................. A45C 11/00 |
| 9,614,569 B2 | 4/2017 | Klsberg et al. | |
| 9,720,442 B2 | 8/2017 | Mongan et al. | |
| 9,788,620 B1 | 10/2017 | Parkinson | |
| 2011/0297578 A1 * | 12/2011 | Stiehl | .................. B29C 45/1676 206/701 |
| 2014/0110275 A1 * | 4/2014 | Wu | ........................ A45C 11/00 206/37 |
| 2014/0268519 A1 * | 9/2014 | Huang | ................. H04B 1/3888 361/679.01 |

(Continued)

*Primary Examiner* — Daniel M Pasiewicz
(74) *Attorney, Agent, or Firm* — Dickinson Wright RLLP

(57) ABSTRACT

An accessory case that can be used for protecting a separate portable electronic device may include a structural shell configured to contain the electronic device, a camera opening to align with a camera on the electronic device, and a button cover that can be used for actuating a button on the electronic device. The structural shell can include an outer layer, an internal layer, and a microfiber lining. The camera opening can include a chamfered or angled edge that reduces the effects of camera flash on the camera. The button cover can include an outer button cover component that is coupled to the outer layer. The outer button cover component, which may be anodized aluminum, can be a different material than the outer layer, which may include leather.

20 Claims, 22 Drawing Sheets

(56) References Cited

U.S. PATENT DOCUMENTS

| | | | |
|---|---|---|---|
| 2015/0060309 A1* | 3/2015 | Sartee | A45C 11/00 206/37 |
| 2015/0068935 A1* | 3/2015 | Kay | A45C 13/36 206/320 |
| 2015/0189963 A1* | 7/2015 | Lai | A45C 13/008 224/191 |
| 2016/0198026 A1* | 7/2016 | Del Toro | H04B 1/3888 455/575.8 |
| 2017/0013925 A1* | 1/2017 | Fathollahi | A45C 13/02 |
| 2018/0034495 A1* | 2/2018 | Kim | A45C 11/00 |
| 2018/0115339 A1* | 4/2018 | Altschul | H04B 1/3888 |

* cited by examiner

FEATURES OF A CAMERA OPENING AND BUTTONS FOR AN ACCESSORY CASE OF AN ELECTRONIC DEVICE

CROSS-REFERENCE TO RELATED APPLICATIONS

This application claims the benefit of priority to U.S. Provisional Application No. 62/384,182, filed on Sep. 6, 2016, and titled "FEATURES OF A CAMERA OPENING AND BUTTONS FOR AN ACCESSORY CASE OF AN ELECTRONIC DEVICE," the disclosure of which is incorporated herein by reference in its entirety.

FIELD

The described embodiments relate generally to electronic devices. More particularly, the described embodiments relate to accessory cases for portable electronic devices.

BACKGROUND

Many portable electronic devices now have display screens, buttons, cameras, flashes, and other desirable components. As portable electronic devices become smaller and more powerful, it has become popular to use accessory cases or other protective accessories in which to contain or hold the a portable electronic device, so as to minimize damage or shock from drops or other jarring events. These protective accessory cases often come with integrated openings and other items to accommodate features on the portable electronic devices, such as displays, buttons, cameras, flashes, speakers, ports, and the like. Although useful, accessory cases can sometimes diminish the ease of use or full functionality of features on their protected electronic devices.

SUMMARY

Representative embodiments set forth herein describe various structures, features, and methods of use for the disclosed protective accessory cases for portable electronic devices.

In one aspect, an accessory case for an electronic device is described. The accessory case may include a structural shell having a size and shape in accordance with the electronic device. The accessory case may further include a layer covering an outer surface of the structural shell. The accessory case may further include a through hole that defines an opening in the structural shell and the layer. The accessory case may further include an accessory trim surrounding the through hole. The accessory trim may be flush, or co-planar, with respect to the layer.

In another aspect, accessory case for an electronic device is described. The accessory case may include a structural shell having a size and shape in accordance with the electronic device. The accessory case may further include a layer covering a surface of the structural shell. The layer may include a first material and an opening in the first material. The accessory case may further include a button cover positioned at least partially in the through hole. The button cover may include a second material different than the first material.

In another aspect, a method for assembling an accessory case suitable for use with an electronic device is described. The method may include securing a layer with an outer surface of a structural shell. The structural shell may include a size and shape in accordance with the electronic device. The method may further include forming a through hole that defines an opening in the structural shell and the layer. The method may further include receiving an accessory trim. The accessory trim may surround the through hole. In some embodiments, the accessory trim is flush, or co-planar, with respect to the layer.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following detailed description, figures, and claims.

BRIEF DESCRIPTION OF THE DRAWINGS

The included drawings are for illustrative purposes and serve only to provide examples of possible structures and methods for the disclosed protective accessory cases for portable electronic devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1A:
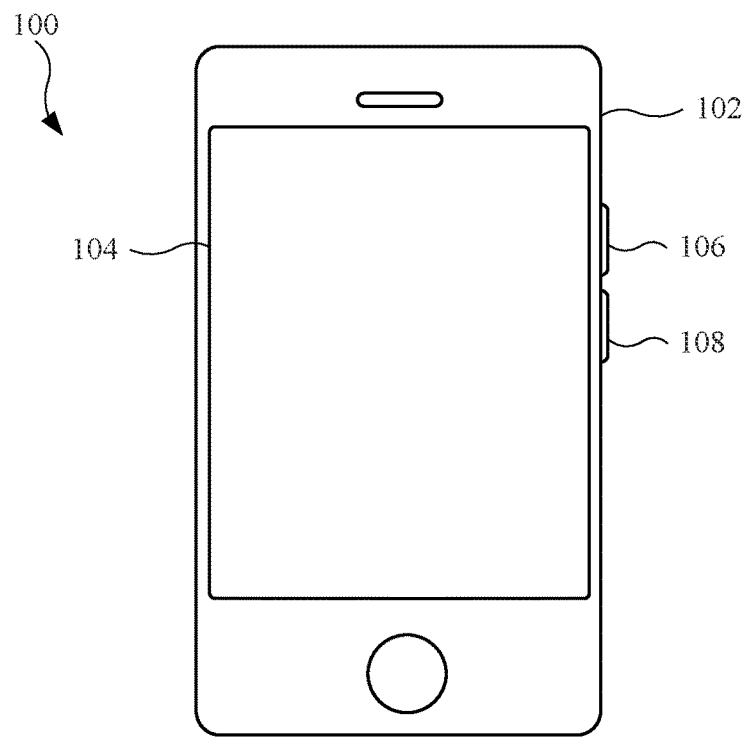
FIG. 1A illustrates in top plan view an exemplary portable electronic device, according to various embodiments of the present disclosure.

Accessories are commonly used in conjunction with consumer electronic devices, and some may be used to protect consumer electronic devices. For example, protective accessory cases may be employed to partially or fully surround a consumer electronic device such that the consumer electronic device is protected from damage. Although useful, such accessory cases can sometimes diminish the ease of use or full functionality of features on their protected electronic devices. There is thus a desire for improved electronic device protective accessory cases that are aesthetically pleasing while still allowing full functionality of features on the associated electronic devices.

The embodiments set forth herein provide various structures and methods for forming protective accessory cases to be used with separate portable electronic devices (also simply referred to as electronic devices). In various embodiments, an accessory case for an electronic device can include at least a structural shell, a camera opening, and a button cover. The structural shell can include a size and shape to receive and contain the electronic device, and also protect the electronic device. The button cover is positioned to align with a button of the electronic device when the electronic device is contained within the structural shell. The accessory case may further include an outer layer and an internal layer that cover the structural shell. The outer and internal layers may be formed from the same material. Alternatively, the internal layer may include a microfiber lining. The camera opening may define a through hole formed in the structural shell and the aforementioned layers in a location that aligns with a camera of the electronic device when the electronic device is contained within the structural shell. The camera opening can include a chamfered or angled edge that reduces camera flash effects (associated with reflected light from the camera flash) to the camera during use of the camera. As such, no additional trim may be needed around the camera opening. The button cover can include an outer button cover component that is separate from and coupled to the outer layer.

The various embodiments set forth herein provide several improvements in protective accessory cases for portable electronic devices, particularly with respect to camera openings and button covers on such improved accessory cases. In some embodiments, the outer layer of the accessory case can include silicone, plastic, or a similar material, and the outer button cover component can also include a silicone, plastic, or a similar material. In other embodiments, the outer layer can include leather and the outer button cover component can include anodized aluminum. In some embodiments, the outer button cover component can also include a different color than that of the outer layer to increase aesthetic effects of the accessory case.

The various embodiments set forth herein provide methods for forming an accessory case for an electronic device. For example, in some embodiments, an outer layer is adhered to an internal layer to form a structural shell. Also, in some embodiments, an opening, or through hole, is created through the structural shell, the outer layer, and the internal layer. Also, an outer button cover component can be placed over the opening at an outer surface. Further, a backing plate can be placed over the opening at an inner surface. Further, a fastener can be inserted into an opening through the backing place and a cavity in the outer button cover component. Also, the fastener can be compressed against the backing plate and into the cavity to form an interference fit between the various components.

The foregoing approaches provide various structures and methods for the disclosed protective accessory cases for portable electronic devices. A more detailed discussion of these structures, methods, and features thereof is set forth below and described in conjunction with FIGS. 1-22, which illustrate detailed diagrams of devices and components that can be used to implement these structures, methods, and features.

FIG. 1A illustrates a top plan view of an exemplary portable electronic device, or simply an electronic device, according to various embodiments of the present disclosure. The electronic device 100 can take the form of a smart phone, for example, although it will be readily appreciated that such a device might also be a media playback device, a personal digital assistant, a laptop computer, or any other suitable portable electronic device. The electronic device 100 can include an outer housing 102, or enclosure, which can be adapted to hold a processor and other electronic components inside, and can also provide space for a display 104 (which may include a touchscreen), and one or more speakers, microphones, ports, and jacks, among other possible device components. In particular, the electronic device 100 can include a camera (not shown), and one or more side buttons, such as a first button 106 and a second button 108. However, the first button 106 and/or the second button 108 may be replaced or substituted with a switch. The electronic device 100 can also be suitable for use with a protective accessory case, which is described in greater detail below.

Figure 1B:
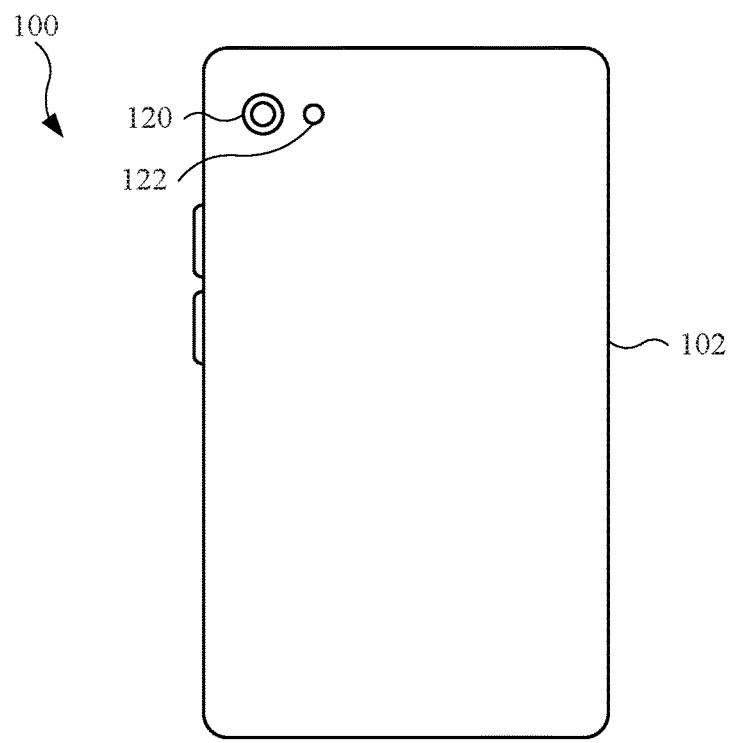
FIG. 1B illustrates a rear plan view of the electronic device shown in FIG. 1A.

FIG. 1B illustrates a rear plan view of the electronic device 100 shown in FIG. 1A. As shown, the electronic device 100 may include a camera 120 designed to capture images, in the form of still images and/or video. In order to enhance the appearance of the images, the electronic device 100 may further include a camera flash 122 that provides a light source for illumination during use of the camera 120. Both the camera 120 and the camera flash 122 may protrude, or at least be made visible, by an opening in the outer housing 102.

Figure 2A:
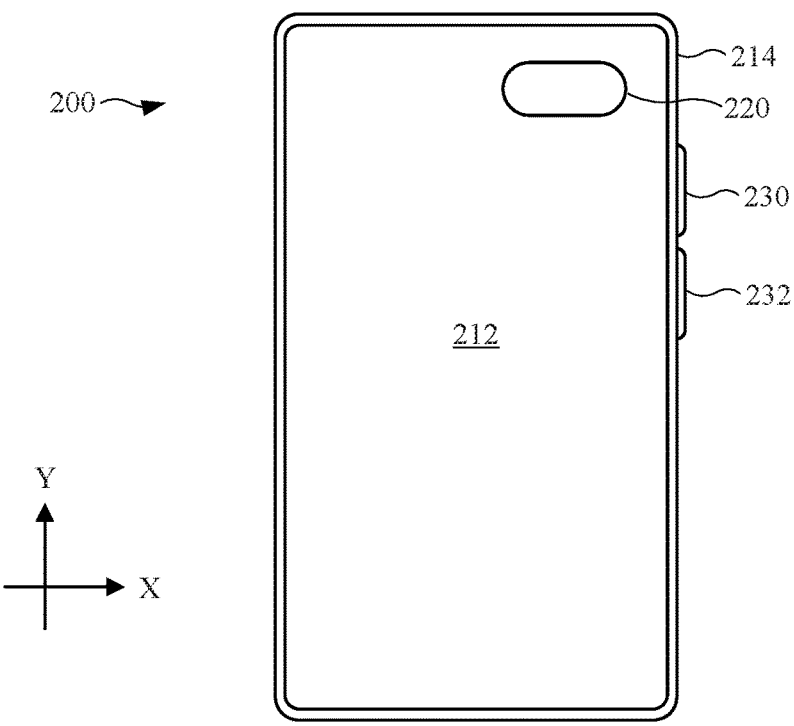
FIG. 2A illustrates a top plan view of an exemplary protective accessory case configured for use with the portable electronic device of FIG. 1, according to various embodiments of the present disclosure.
Figure 2B:
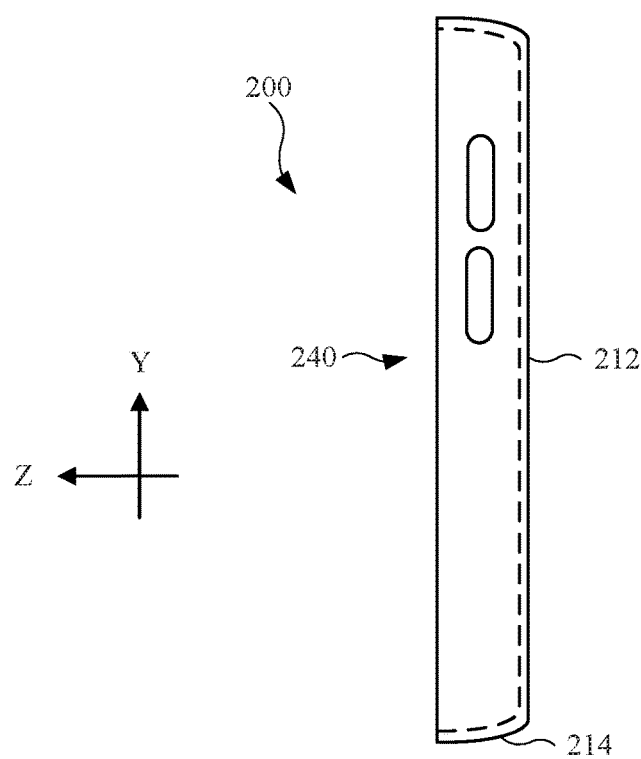
FIG. 2B illustrates a side elevation view of the exemplary protective accessory case of FIG. 2A.

FIGS. 2A-2B illustrate an exemplary protective accessory case (or simply accessory case) suitable for use with an electronic device, such as the electronic device 100 (shown in FIGS. 1A and 1B). The accessory case 200 can include a protective case that is used to contain and protect an associated and separate portable electronic device. FIG. 2A illustrates a top plan view of the accessory case 200. The accessory case 200 may include a structural shell covered by one or more layers. The structural shell may include a hard or durable material, such as plastic, hardened silicone, leather, or a composite material. Also, the structural shell may be referred to as an internal layer throughout this detailed description due to its positioning between the outer and internal layers. This will be further discussed below. The accessory case 200 may include a planar back region 212 and sidewalls 214 extending from the planar back region 212. The accessory case 200 may further include camera opening 220, or through hole, in the planar back region 212. The camera opening 220 is in a location corresponding to the camera 120 and the camera flash 122 (both shown in FIG. 1B). In this regard, the camera opening 220 can allow access to the camera 120 and the camera flash 122, and does not cover these features. Also, the accessory case 200 may include several button covers, such as a first button cover 230 and a second button cover 232, that are positioned on one of the sidewalls 214, and in particular, in a location corresponding to the first button 106 and the second button 108 (both shown in FIG. 1A), respectively. In this manner, the button covers are aligned with the buttons of the electronic device. It should be noted that the number of button covers may match the number of buttons of an electronic device, and may be in a location or locations corresponding to the buttons of an electronic device.

FIG. 2B illustrates a side view of the accessory case 200 shown in FIG. 2A. As shown, the planar back region 212 and the sidewalls 214 may combine to form an internal volume 240 having a size and shape to receive an electronic device, such as the electronic device 100 (shown in FIG. 1A). Accordingly, the internal volume 240 may represent a void or space in the accessory case 200.

As shown in FIGS. 2A-2B, Cartesian axes X, Y, and Z form a right-handed coordinate frame for illustration purposes only. Accordingly, the accessory case 200 may include a substantially planar profile in the XY plane (as shown in FIG. 2A), with a thickness along the Z axis (as shown in FIG. 2B). These features can correlate substantially to that of an electronic device for which the accessory case 200 can be used. One of ordinary skill will recognize that the terms 'besides,' 'above,' and 'bottom' are not limiting of embodiments disclosed herein, and only used in context to indicate a relative positioning of elements. Further, in order to depress the aforementioned of buttons of an electronic device when the electronic device is positioned in the accessory case 200, the first button cover 230 and the second button cover 232 may be actuated along an axis that is aligned substantially along the X-axis (as shown in FIG. 2A). Alternatively, the first button cover 230 and the second button cover 232 may be located elsewhere, in accordance with alternate locations of the buttons, and may include an actuation axis in another direction.

In many arrangements, a camera opening on an accessory case can provide access to a camera and a camera flash on an associated portable electronic device for which the accessory case is being used. Due to the relatively small nature of many portable electronic devices, the camera flash is often placed in close proximity to the camera such that light from the camera flash often corrupts or interferes with an image(s) captured by the camera, resulting in pictures of lesser quality. However, accessory cases and/or associated portable electronic devices described herein may include features that account for such undesirable camera flash effects.

Figure 3:
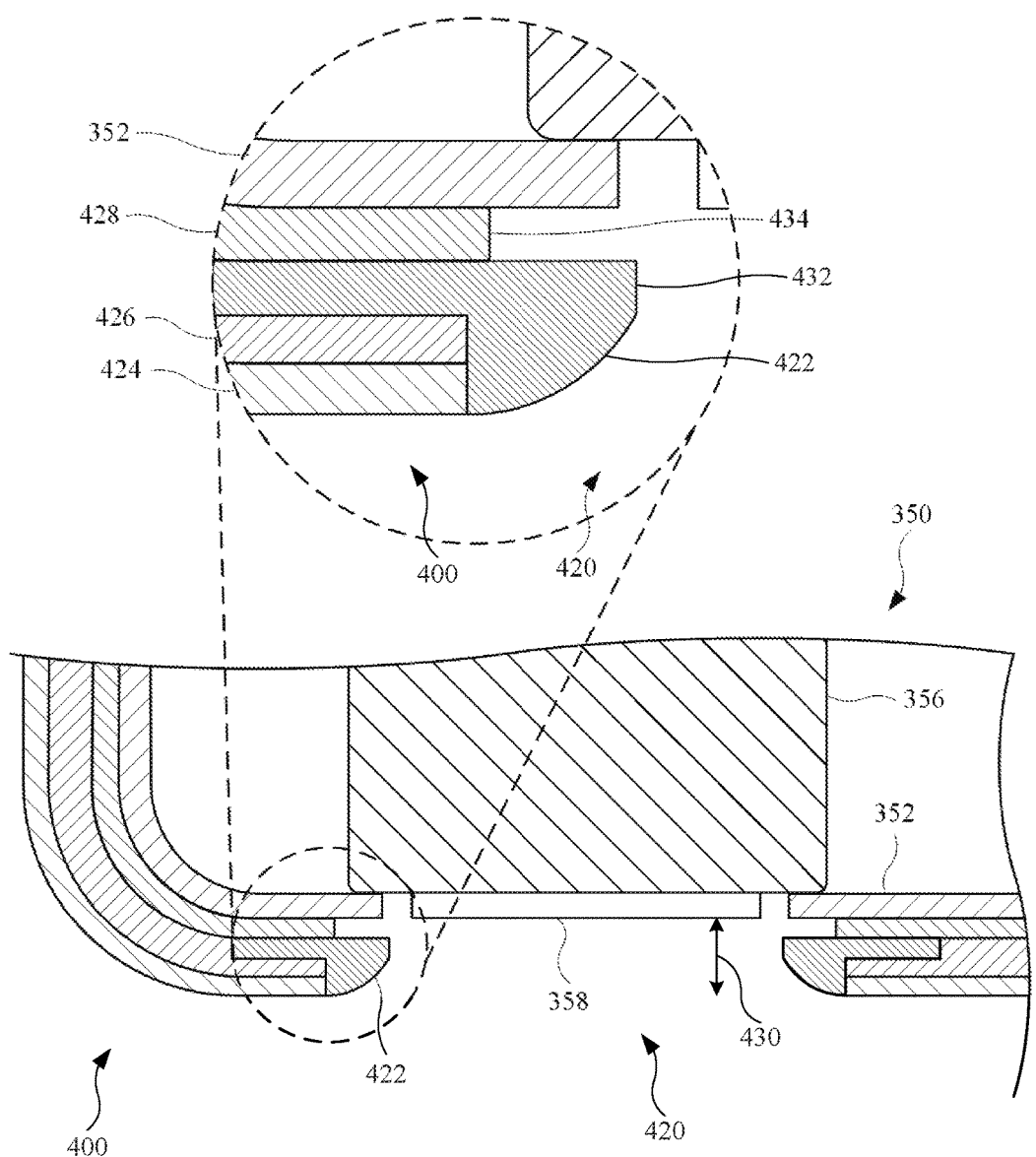
FIG. 3 illustrates a cross-sectional view of an exemplary camera opening region on a protective accessory case according to various embodiments of the present disclosure.

FIG. 3 illustrates a cross-sectional view of an accessory case 400 with an electronic device 350 positioned in the accessory case 400, according to various embodiments of the present disclosure. For purposes of simplicity and illustration, various portions of the electronic device 350 and the accessory case 400 are not shown. As shown, the electronic device 350 may include an enclosure 352 and a camera 356 aligned with an opening of the enclosure 352. Also, the camera 356 may include a protective layer 358, which may include glass or plastic, covering a lens (not shown) of the camera 356.

The accessory case 400 may include an internal volume having a size and shape in accordance with the electronic device 350. In other words, the accessory case 400 is sized and shaped to receive the electronic device 350. Also, the accessory case 400 may include a camera opening 420 representing a through hole in layers of the accessory case 400. Also, the camera opening 420 is in a location corresponding to the camera 356 and a light source (not shown)

that provides a camera flash, such that the camera 356 and the light source are accessible to a user through the accessory case 400.

The accessory case 400 may further include an accessory trim 422 that surrounds an outer circumference of the camera opening 420. The accessory trim 422 enhance an appearance of the accessory case 400 at the camera opening 420. This accessory trim 422 may be separate from or integrally formed with the rest of accessory case 400. Also, the accessory trim 422 can include black or darkened color, and accordingly, the accessory case 400 may include relatively dark appearance surrounding the circumference of camera opening 420. This relatively dark region may minimize the effect of wayward camera flash on the camera 356 itself. In addition, one or more other components at or near the accessory trim 422 can be of a black or darkened color as well. Such darkened regions can function to absorb some of the reflected light from the camera flash, such that the absorbed light does not enter the camera 356 during an image capture event.

In addition to absorbing camera flash, the accessory trim 422 can also help to protect the camera 356 and the protective layer 358 in the event of drops or other jarring event to the electronic device 350 and accessory case 400. As such, the accessory trim 422 may include a plastic, silicone, or other suitably firm material that is adapted to provide shock absorption. In addition, the protective layer 358 can be recessed some distance from a plane defined by the outer surface of the accessory trim 422 of the accessory case 400, as exemplified in FIG. 3. This plane can also be the same plane that defines the outer surface of the accessory case 400 such that the accessory trim 422 is co-planar, or flush, with respect to the outer surface (in this case, the outer layer 424 depicted in the enlarged view). Accordingly, drops or other sudden contacts are more likely to impact the accessory trim 422 and/or the accessory case 400, rather than impact the protective layer 358 and the camera 356. In various arrangements, a recessed distance 430 between the outer surface of the accessory case 400 and the protective layer 358 can be approximately 0.5 to 1 millimeters ("mm"), although other recessed distances are also possible as may be desired.

The enlarged view in FIG. 3 depicts different layers of the accessory case 400 as the accessory case 400 abuts the enclosure 352 of the electronic device 350. In addition to the accessory trim 422 around the camera opening 420, the accessory case 400 can also include an outer layer 424, an internal layer 426, and a microfiber lining 428 along an internal surface. In this regard, the outer layer 424, the internal layer 426, and the microfiber lining 428 can collectively form the accessory case 400. The outer layer 424 may include a material that forms an aesthetically pleasing exterior for the accessory case 400, such as silicone, leather, or various types of softer plastics. The internal layer 426, which may also be referred to as a "frame," a structural shell, or other suitable structural term, may include a more rigid material that is suited to provide firm structure and dampen or dissipate shocks, such as a polycarbonate or hard plastic. The microfiber lining 428 can be a thin and smooth material that provides reduced friction or abrasions when placed in contact with the enclosure 352.

Where the accessory trim 422 can be a separate part that is formed within the camera opening 420, the various layers of the accessory case 400 may be stepped with respect to the location of the accessory trim 422. For example, the accessory trim 422 may be placed around the ends of the outer layer 424 and the internal layer 426, such that the ends of these layers are not visible. In some instances, the accessory trim 422 may include a trim end 432 that extends into the camera opening 420 farther than an end 434 of the microfiber lining 428, creating a stepped arrangement and appearance between the accessory trim 422 and the microfiber lining 428.

Figure 4:
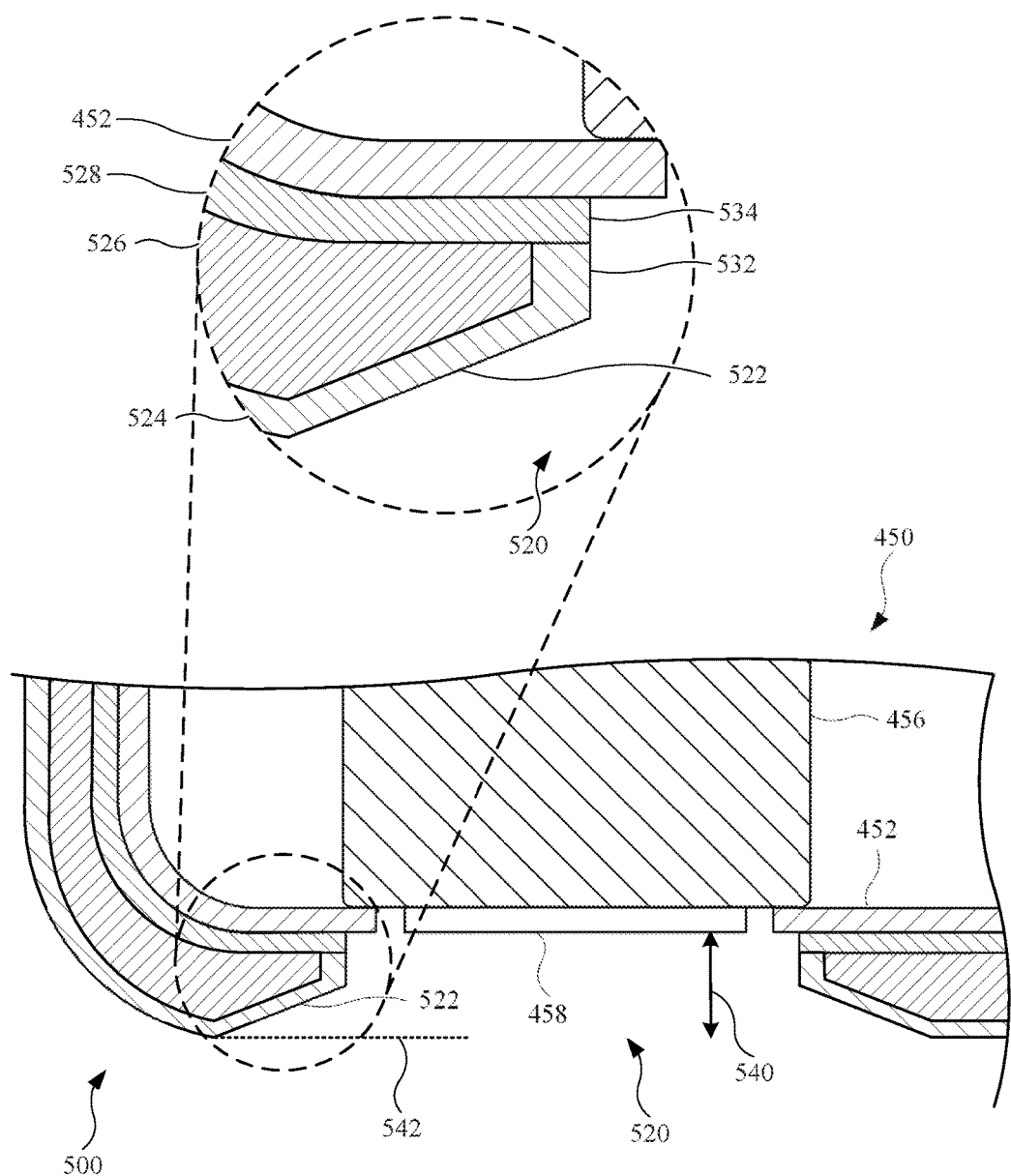
FIG. 4 illustrates a cross-sectional view of an exemplary alternative camera opening region on a protective accessory case, according to various embodiments of the present disclosure.

FIG. 4 illustrates a cross-sectional view of an exemplary alternative camera opening region on a protective accessory case, according to various embodiments of the present disclosure. As shown, an electronic device 450 is positioned in an accessory case 500. The electronic device 450 may include a housing 452 having an opening for a camera 456. The camera 456 may include a protective layer 458 that covers a lens (not shown) of the camera 456. The camera 456 can be made accessible through a camera opening 520 of the accessory case 500. The camera opening 520 can take the form of a through hole formed in the accessory case 500, such that the camera 456 is accessible therethrough. Although, the accessory case 500 does not include an accessory trim, the camera opening 520 can still include many features similar to that of camera opening 420 (shown in FIG. 3).

For example, rather than have any accessory trim, the accessory case 500 may include an angled region 522 around the camera opening 520. Specifically, the angled region 522 can provide a gradually sloped angle or chamfer that surrounds the camera opening 520, as shown in FIG. 4. The angled region 522 can be formed by chamfering one or more layers of the accessory case 500, such as an outer layer and an internal layer (discussed below). This angled region 522 can function to reflect and/or refract some of the light (from a camera flash) away from the camera opening 520, such that the reflected or refracted light does not enter the camera 456 during an image capture event of the camera 456.

In addition to reducing camera flash effects on the camera 456, the angled region 522 can also help to protect the camera 456 and the protective layer 458 in the event of drops or other jarring events to the electronic device 450. In general, the protective layer 458 can be recessed some distance from a plane defining the outermost surface of the accessory case 500 near the camera opening 520. Accordingly, drops or other sudden contacts are more likely to impact the accessory case 500, rather than impact the protective layer 458 and the camera 456. In various arrangements, a recessed distance 540 between the outer surface of the accessory case 500 and the protective layer 458 can be approximately 0.2 to 1 mm, although other recessed distances are also possible as may be desired.

The enlarged view in FIG. 4 depicts different layers of the accessory case 500 as the accessory case 500 abuts the housing 452 of the electronic device 450. Similar to the foregoing embodiment, the accessory case 500 can include an outer layer 524, an internal layer 526, and a microfiber lining 528, with the outer layer 524 and the microfiber lining 528 positioned on an exterior surface and an interior surface, respectively, of the internal layer 526. The outer layer 524, internal layer 526, and microfiber lining 528 can collectively form the accessory case 500 in some embodiments. The outer layer 524 may include a material such as silicone, leather, or various types of softer plastics. The internal layer 526 may include a more rigid material that is suited to a structural shell that dampens or dissipates shocks. The microfiber lining 528 can be a smooth material that provides reduced friction or abrasions when placed in contact with the associated portable electronic device.

The angled region 522 can represent a chamfer in one or more of the outer layer 524, the internal layer 526, and the microfiber lining 528. However, shown in the enlarged view, only the edge of the internal layer 526 is chamfered. This can result in a constant or near constant thickness for each of the outer layer 524 and the microfiber lining 528, and can also result in an overall chamfer around the circumference of the camera opening 520. The angled region 522 can result in a gradual tapering of the accessory case 500 around the camera opening 520 of the accessory case 500, such that light from the camera flash is reflected, refracted, and/or otherwise directed away from the camera opening 520. The angle of the angled region 522 can vary as may be suitable for the dimensions of the camera 456, the electronic device 450, the camera opening 520, and/or the accessory case 500. In various embodiments, the angled region 522 may include a chamfered edge that rises at an angle approximately between 5 and 90 degrees with respect to a plane 542 (represented by a horizontal dotted line) that is parallel with respect to the protective layer 458. In some embodiments, the angle can be between approximately 10 and 30 degrees.

Unlike the foregoing embodiments, no darkened region is used to minimize the amount of flash that interferes with the camera. This can result in an improved appearance having a continuous color and texture at the boundary of the camera opening 520. Furthermore, unlike the foregoing embodiment, the various layers of the accessory case 500 are not necessarily stepped with respect to the location of the camera opening 520. As shown, the outer layer 524 may include an outer layer end 532 that extends into the camera opening 520 the same distance as a microfiber end 534 of microfiber lining 528, creating an even arrangement and appearance between the outer layer 524 and the microfiber lining 528. This even arrangement can also create a smoother and more aesthetically pleasing appearance for the accessory case 500. The even arrangement and appearance at the outer layer end 532 and the microfiber end 534 can be achieved by adhering these materials together and then cutting them to form the camera opening 520.

Figure 5:
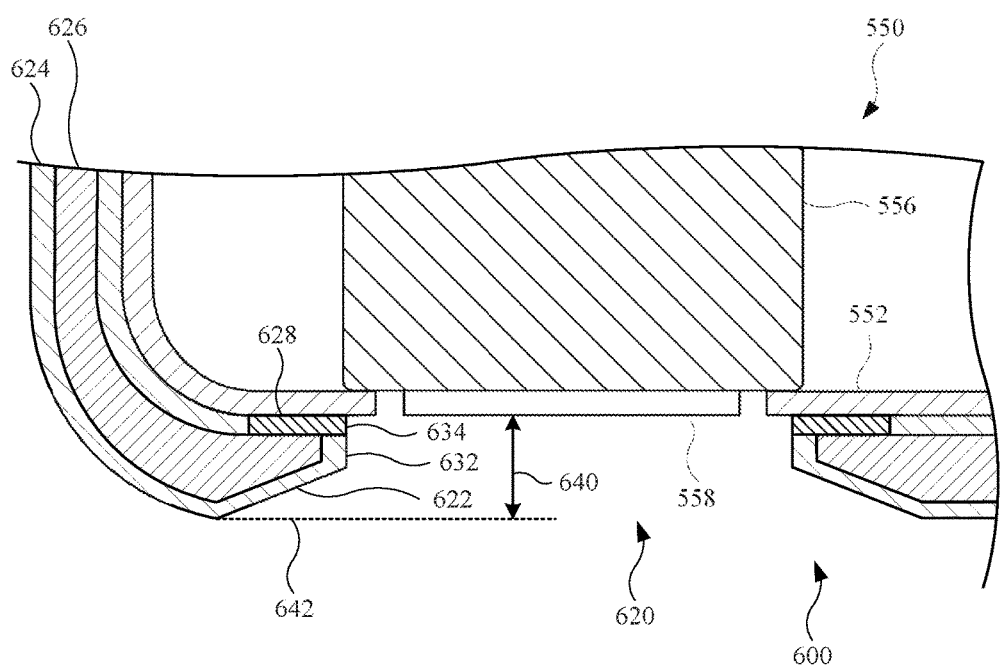
FIG. 5 illustrates a cross-sectional view a close-up of another alternative camera opening region according to various embodiments of the present disclosure.

FIG. 5 illustrates an enlarged cross-sectional view of another exemplary alternative camera opening region on a protective accessory case, according to various embodiments of the present disclosure. As shown, an electronic device 550 is positioned in an accessory case 600. With an electronic device 550 positioned in the accessory case 600, at least one of the layers of the accessory case 600 may abut a housing 552 of the electronic device 550. The accessory case 600 may further include a camera opening 620, defining a through hole in the layers of the accessory case 600, exposing a protective layer 558 and a camera 556, both of which are part of the electronic device 550.

The accessory case 600 may include an outer layer 624, an internal layer 626, and a microfiber lining 628. The outer layer 624, the internal layer 626, and the microfiber lining 628 can collectively form the accessory case 600. The outer layer 624 may include a relatively softer material that is still aesthetically pleasing for regular use, such as leather, cloth, or various types of softer plastics. In addition to being on the outside of the accessory case 600, the material for the outer layer 624 may also wrap around the internal layer 626 or otherwise form a portion of a surface of the accessory case 600, as shown. Accordingly, the outer layer 624 may include a single piece of material that also defines an inner layer of the accessory case 600. Also, the outer layer 624 and the microfiber lining 628 can combine to form the inside surface of the accessory case 600, and in some cases, the full inside surface of the accessory case 600. Also, the internal layer 626 may include a rigid material that is suited to provide firm structure and dampen or dissipate shocks, and the microfiber lining 628 can be a smooth material that provides reduced friction or abrasions when placed in contact with the electronic device 550.

The accessory case 600 may include an angled region 622 that represents an edge that is rounded or chamfered near the camera opening 620. The angled region 622 may be created by modifying one or more of the outer layer 624, the internal layer 626, and the microfiber lining 628. Accordingly, the outer surface of the accessory case 600 can be angled or chamfered toward an edge at the camera opening 620. As shown in FIG. 5, only the end of the internal layer 626 is angled or chamfered. Similar to the foregoing embodiment, the angled region 622 can result in a tapering of the accessory case 600 around the camera opening 620, such that light from the camera flash is more readily reflected, refracted, and/or otherwise directed away from the camera opening 620. The angle of the angled region 622 can vary as may be suitable for the dimensions of the camera 556, the electronic device 550, the camera opening 620, and/or the accessory case 600. The angled region 622 can rise at an angle that is approximately between 5 and 90 degrees with respect to a plane 642 (represented by a horizontal dotted line) that is parallel to the protective layer 558 of the camera 556. However, in embodiments, the angled region 622 is formed at an angle between about 10 and 30 degrees.

In this embodiment, no darkened region is used in conjunction with angled region 622 to minimize the amount of reflected light from the flash that interferes with the camera 556. Also, with no structural element(s) representing a darkened region of the accessory case 600 can result in an improved appearance having a continuous color and texture at the boundary of the camera opening 620. Further, the various layers of the accessory case 600 are not stepped with respect to the location of the camera opening 620, such that the outer layer 624 may include an end 632 that extends to the camera opening 620 the same distance as an end 634 of microfiber lining 628, creating an even arrangement and appearance between the ends of the outer layer 624 and the microfiber lining 628. This even arrangement can also create a smoother and more aesthetically pleasing appearance for the accessory case 600. Again, the even arrangement and appearance at the end 632 of the outer layer 624 and the end 634 of the microfiber lining 628 can be achieved by adhering these materials together and then cutting them to form the camera opening 620.

In addition to reducing camera flash effects to the camera 556, the angled region 622 can also help to protect the camera 556 and the protective layer 558 in the event of drops or other jarring events to the electronic device 550 and accessory case 600. In various arrangements, a recessed distance 640 between the protective layer 558 and a plane 642 (parallel with respect to an outermost surface of the accessory case 600) can be approximately 0.2 to 1 mm, although other recessed distances are also possible as may be desired. Accordingly, drops or other sudden contacts are more likely to impact directly the accessory case 600, rather than impact directly the protective layer 558 and/or the camera 556.

Figure 6A:
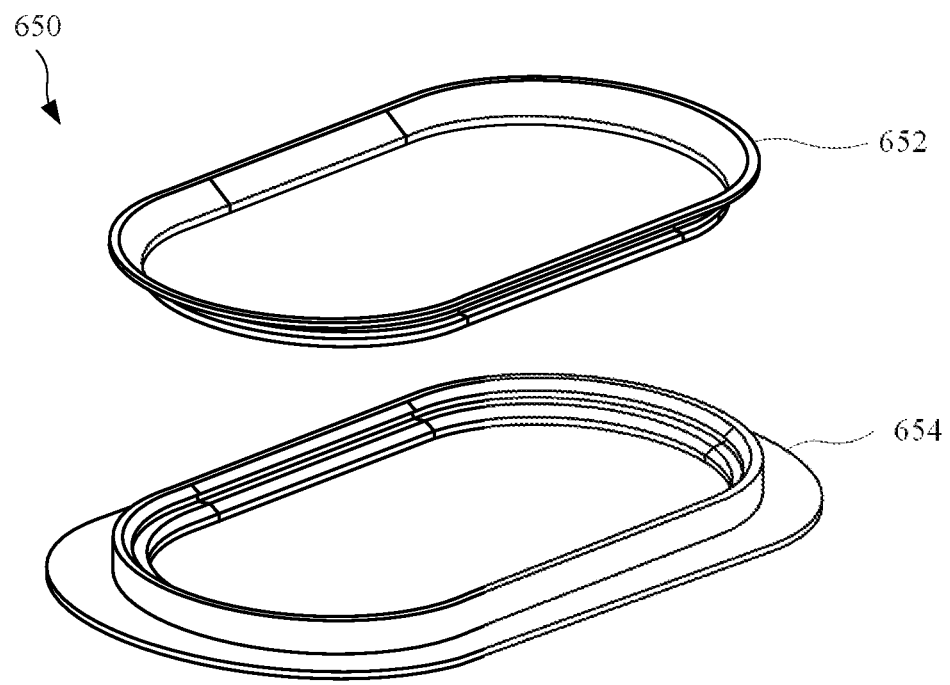
FIG. 6A illustrates an exploded view various components for an alternative camera opening according to various embodiments of the present disclosure.

FIG. 6A illustrates an exploded view of various components for an alternative camera opening according to various embodiments of the present disclosure. An accessory trim 650 may include one or more features used in an accessory case and positioned around an opening in the accessory case, with the opening in a location corresponding to a camera and a camera flash of an electronic device. The accessory trim 650 may include a first ring 652. In some embodiments, the first ring 652 is formed from a metal, such as aluminum. Also, the first ring 652 can be anodized to enhance the appearance and/or rigidity of the first ring 652. Also, the accessory trim 650 may further include a second ring 654 designed to mate, or attach, with the first ring 652. In some embodiments, the second ring 654 includes a polymeric material, such as plastic. Further, in some embodiments, the second ring 654 includes a moldable polymer. In this regard, the second ring 654 may couple with the first ring 652 by a molding operation, such as insert molding, whereby the first ring 652 is placed in a mold cavity (not shown) and the moldable polymer is injected into the mold cavity to form the second ring 654. The combination of the first ring 652 and the second ring 654 can form an outer circumference for a camera opening that can be formed on an accessory case for containing and protecting an associated portable electronic device having a camera.

Figure 6B:
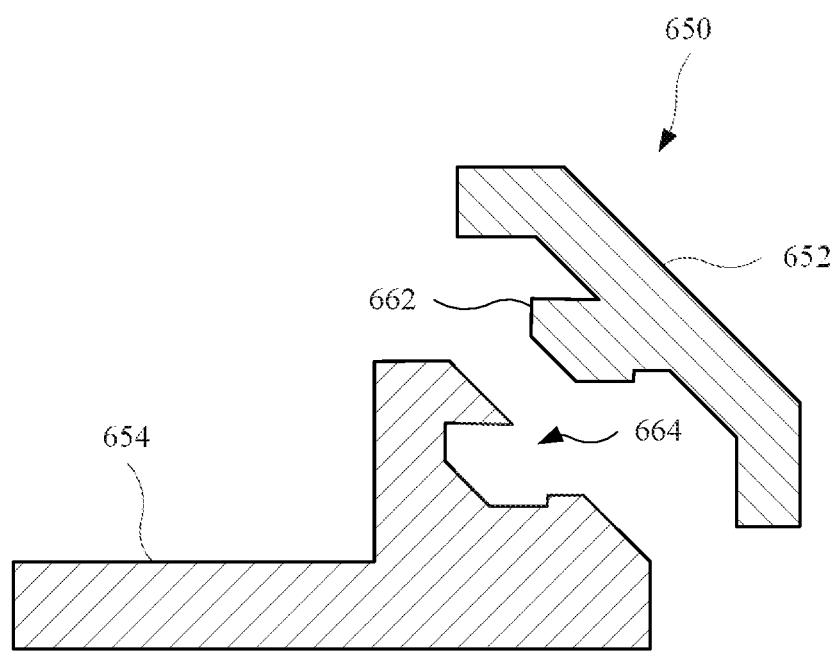
FIG. 6B illustrates a cross-sectional view of the first ring and the second ring shown in FIG. 6A.

FIG. 6B illustrates a cross-sectional view of the first ring 652 and the second ring 654 shown in FIG. 6A. As shown, the first ring 652 may include a protrusion 662 and the second ring 654 may include a recess 664. The first ring 652 may interlock with the second ring 654 when the recess 664 receives the protrusion 662. It should be noted that the protrusion 662 and the recess 664 may extend around the first ring 652 and the second ring 654, respectively, in selected portions or may include a continuous feature around a circumference of the respective rings.

Figure 7A:
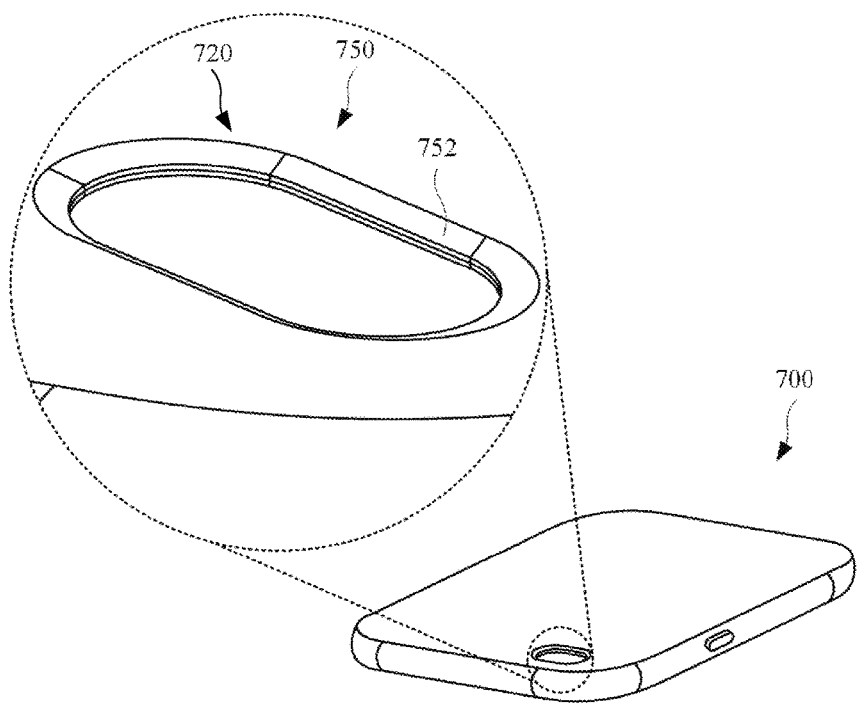
FIG. 7A illustrates a front perspective view of an accessory case having a camera opening according to various embodiments of the present disclosure.

FIG. 7A illustrates a front perspective view of an accessory case having a camera opening according to various embodiments of the present disclosure. The accessory trim 750 may be substantially similar to the accessory trim 650 (shown in FIG. 6A), and accordingly, may include similar parts and materials. As shown, the accessory trim 750 can be formed around a camera opening 720 of the accessory case 700, with the camera opening 720 providing access to a camera and camera flash on a portable electronic device (not shown) contained within the accessory case 700. A first ring 752 can surround the full circumference of the camera opening 720 and can be the only portion of the accessory trim 750 that is visible from an exterior of the camera opening 720. In other words, the first ring 752 may cover an additional ring(s).

Figure 7B:
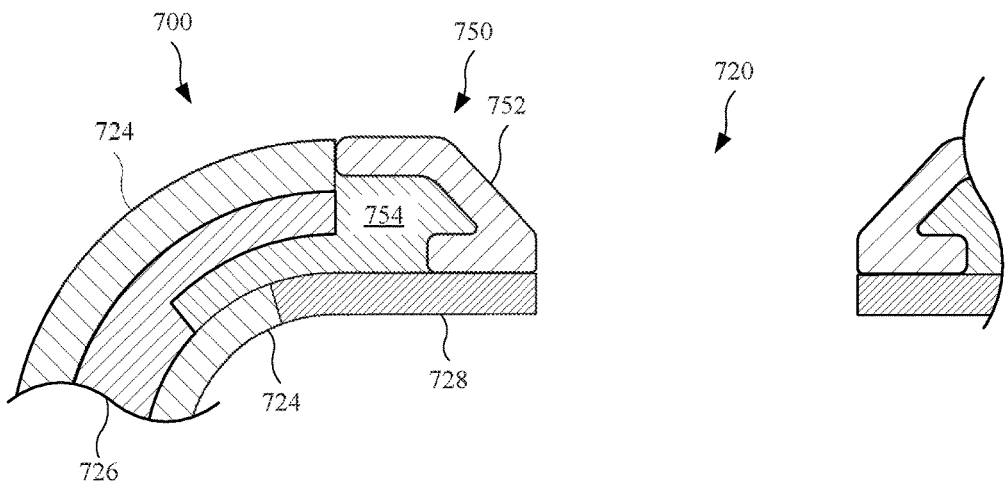
FIG. 7B illustrates a cross-sectional view of the accessory case shown in FIG. 7A.

FIG. 7B illustrates a cross-sectional view of the accessory case 700 shown in FIG. 7A. The accessory case 700 may include an outer layer 724, which may include leather. The accessory case 700 may further include an internal layer 726 covered by the outer layer 724. The internal layer 726 may include polycarbonate or hard plastic, as in previous embodiments. The accessory case 700 may further include a microfiber lining 728.

The accessory case 700 may further include a first ring 752 located atop a second ring 754, with the combined rings inserted around the camera opening 720. The first ring 752 and the second ring 754 may include any material(s) previously described for a first ring and a second ring, respectively. Also, the outer layer 724 may wrap, or at least partially wrap, around the internal layer 726. Further, the outer layer 724 may combine with the atop the internal layer 726 and around the circumference of the camera opening 720, while the microfiber lining 728 can be located at the bottom of the internal layer 726 to facilitate a uniform appearance. Also, in this configuration, the second ring 754 may be covered from view by the first ring 752, the outer layer 724, and the microfiber lining 728.

While various improvements in camera openings have been illustrated and discussed, the disclosed protective accessory cases also provide various improvements in button covers. While the following exemplary accessory cases show and describe various embodiments of a button cover for the accessory case, it should be noted that a single accessory case may include both a camera opening with various embodiments of an accessory trim described herein, as well as various embodiments of a button cover described herein.

Figure 8:
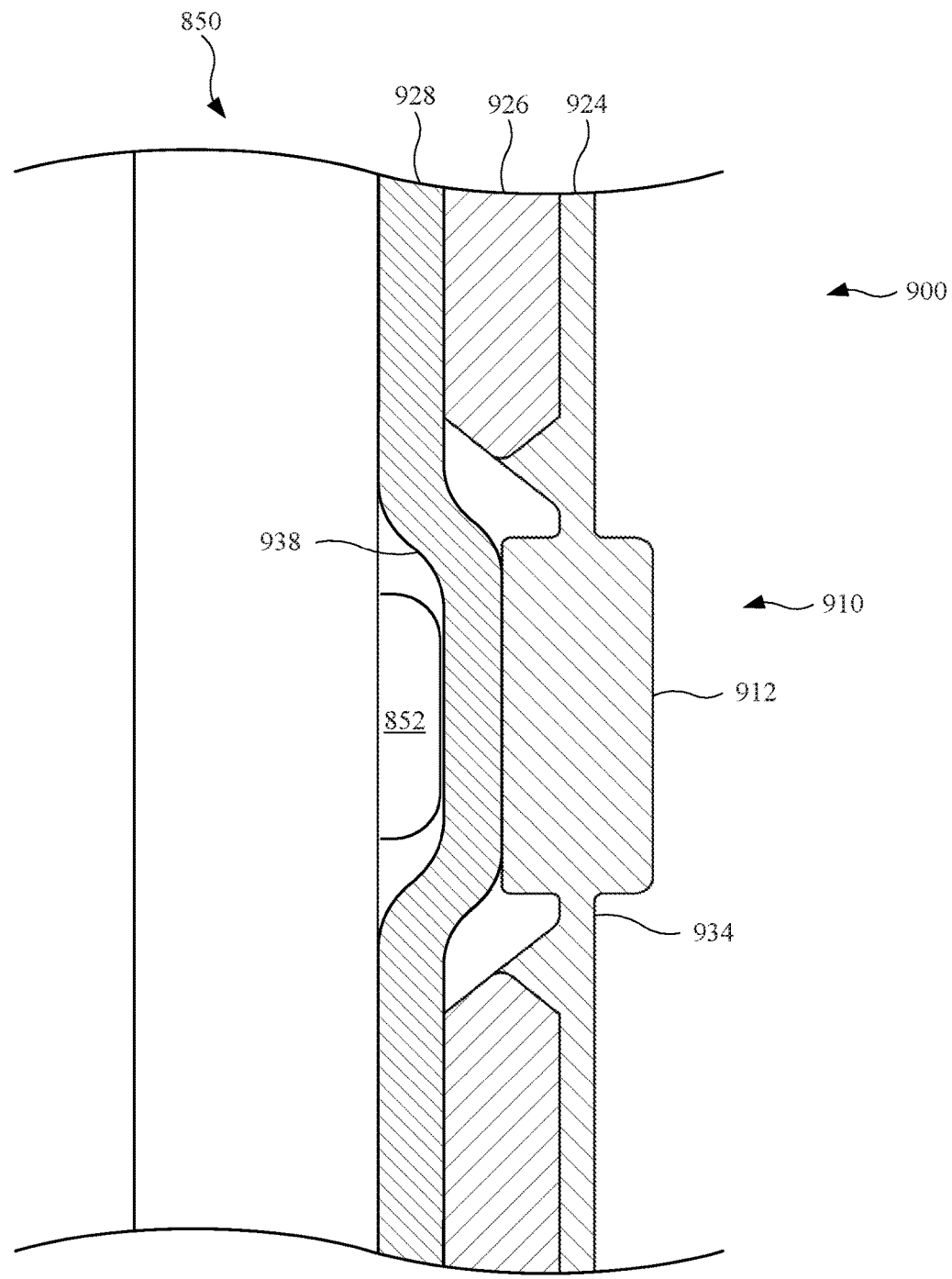
FIG. 8 illustrates a cross-sectional view of an exemplary button cover region on a protective accessory case, according to various embodiments of the present disclosure.

FIG. 8 illustrates a cross-sectional view of an exemplary button cover region on a protective accessory case, according to various embodiments of the present disclosure. As shown, an electronic device 850 includes a button 852, along with an accessory case 900 designed to cover the electronic device 850 and the button 852. For purposes of reference and illustration, only a portion of the electronic device 850 and a portion of the accessory case 900 are shown.

The accessory case 900 can include an outer layer 924, an internal layer 926, and a microfiber lining 928. As shown, the internal layer 926 may include an opening therethrough to accommodate the button cover 910. Conversely, the outer layer 924 and the microfiber lining 928 can continue through the button cover 910, albeit with modifications to accommodate the button cover 910. Accordingly, the region of the button cover 910 can include some layers of the accessory case 900, as well as various other button cover components. In various embodiments, the outer layer 924 may include silicone or a suitable thermoplastic material, while the internal layer 926 may include a more rigid material. Also, in some cases, the button cover 910 includes no additional parts that are separate from the layers of the accessory case 900.

The button cover 910 can include an outer button cover component 912, which represents the primary component for a user to access in order to facilitate actuation of the button 852 of the electronic device 850. That is, the outer button cover component 912 can be positioned over the button 852 and actuated in order to accept a user input and facilitate transfer of the user input to actuate the button 852. As such, the outer button cover component 912 is designed to move toward the button 852, and through the opening in the internal layer 926.

Also, the outer button cover component 912 can be integrally formed with the outer layer 924. To facilitate the physical movement of the outer button cover component 912, the outer layer 924 may include a web region 934 surrounding the button cover 910. The web region 934 can represent a relatively thin portion of the outer layer 924 such that the button cover 910 can readily flex and move when a force is applied to the button cover 910 to actuate the button 852. In addition, the microfiber lining 928 may include an indented flexure region 938, which can also be configured to flex and move with the outer button cover component 912. As shown, various gaps between the outer layer 924, the internal layer 926, and the microfiber lining 928 may also exist to facilitate movement and flexure of components, such as the outer button cover component 912. Also, the outer button cover component 912 can be located at and supported by the outer layer 924 in various embodiments.

Figure 9:
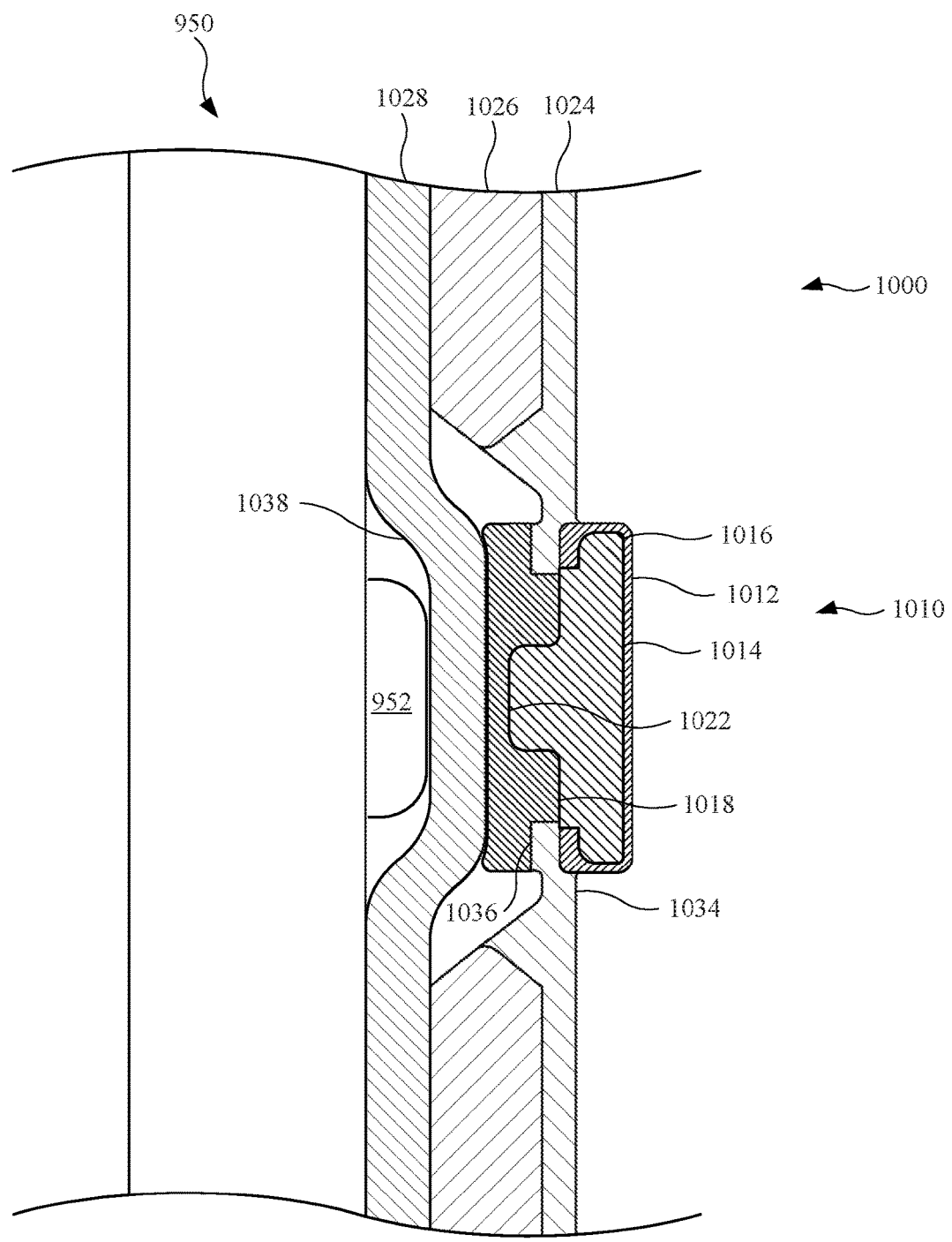
FIG. 9 illustrates a cross-sectional view of a second exemplary button cover region on a protective accessory case according to various embodiments of the present disclosure.

FIG. 9 illustrates a side cross-sectional view a second exemplary button cover region on a protective accessory case, according to various embodiments of the present disclosure. As shown, an electronic device 950 may include a button 952, along with an accessory case 1000 designed to cover the electronic device 950 and the button 952. Also, the accessory case 1000 may include a button cover 1010 positioned in a location to cover the button 952 when the electronic device 950 is positioned in the accessory case

1000. For purposes of reference and illustration, only a portion of the electronic device 950 and a portion of the accessory case 1000 are shown.

As in the foregoing example, the region associated with the button cover 1010 can include portions of the accessory case 1000, as well as various other button cover components. The accessory case 1000 can include an outer layer 1024, an internal layer 1026, and a microfiber lining 1028. The internal layer 1026 may include an opening therethrough to accommodate the button cover 1010. However, unlike the foregoing example, the outer layer 1024 in FIG. 9 may include an opening therethrough to accommodate the button cover 1010. In various embodiments, the outer layer 1024 can similarly be formed from silicone or a suitable thermoplastic material, while the internal layer 1026 may include a more rigid material.

The button cover 1010 may include additional parts that are separate from the layers of the accessory case 1000. For example, the button cover 1010 can include an outer button cover component 1012, which can be located along and supported by the outer layer 1024. Also, the outer button cover component 1012 can be the primary component to facilitate actuation of the button 952. As such, the outer button cover component 1012 can be configured to accept a user input and facilitate transfer of the user input to actuate the button 952. Also, the outer button cover component 1012 can be configured to move through an opening in the internal layer 1026. The outer layer 1024 may include a web region 1034 surrounding the button cover 1010. The web region 1034 can represent a relatively thin portion of the outer layer 1024 such that the button cover 1010 can readily flex and move when a force is applied to the button cover 1010 to actuate the button 952. Also, the microfiber lining 1028 may include an indented flexure region 1038 that flexes and moves with the button cover 1010, and various gaps between the outer layer 1024, the internal layer 1026, and the microfiber lining 1028 may also exist to facilitate the movement and flexure of components, including the outer button cover component 1012.

As shown in FIG. 9, the outer button cover component 1012 can be a separate part from the outer layer 1024, and can be glued, press fit, and/or otherwise affixed within a recess in the outer layer 1024, with the recess being in a location corresponding to the button 952 when the electronic device 950 is positioned in the accessory case 1000. This can result in the outer layer 1024 having a flange region 1036 that extends inward from the web region 1034 in the outer layer 1024. Also, the flange region 1036 may be relatively thin as compared to the web region 1034. Also, due in part to the separable configuration, the outer button cover component 1012 can include a different color and/or contrast, as compared to the color and/or contrast of the outer layer 1024, and can also have a different feel or texture than the outer layer 1024. Such differences can be used to enhance the overall aesthetic appearance of the accessory case 1000. As shown, the outer button cover component 1012 can define an outer shell that covers an inner button cover component 1014. The inner button cover component 1014 may include a flange 1016 that functions to hold the outer button cover component 1012 in place as it wraps around the flange 1016. Also, the button cover 1010 may include a button cover base 1018 located between the outer layer 1024 and the microfiber lining 1028. As shown, the button cover base 1018 is sandwiched between the inner button cover component 1014 and the microfiber lining 1028 where the opening exists in the internal layer 1026. The button cover base 1018 may include a recess that accepts a protrusion 1022 of the inner button cover component 1014 such that some of the separate components, such as the inner button cover component 1014, do not shift and are held in place against each other.

In various embodiments, the outer button cover component 1012 may include a silicone or thermoplastic material that is the same or similar to the material of the outer layer 1024. Accordingly, the outer button cover component 1012 and the outer layer 1024 can be similar in appearance and feel, but may be distinguish as noted above, such as by having different colors. However, in some instances, the outer button cover component 1012 includes a metal, such as aluminum, including anodized aluminum. The inner button cover component 1014 may include a polycarbonate material and the button cover base 1018 can also be formed from the same or a similar polycarbonate material. When making the button cover 1010, the inner button cover component 1014 can be glued or otherwise affixed to the button cover base 1018. The outer button cover component 1012 can be formed atop the inner button cover component 1014. For example, the outer button cover component 1012 can be formed from silicone and molded around the inner button cover component 1014. Due in part to the outer button cover component 1012 being a physically separate part from the outer layer 1024, these parts can readily be created in different colors or appearances. In addition, a more definitive tactile feedback may also be experienced when the button cover 1010 is depressed to actuate the button 952.

Figure 10:
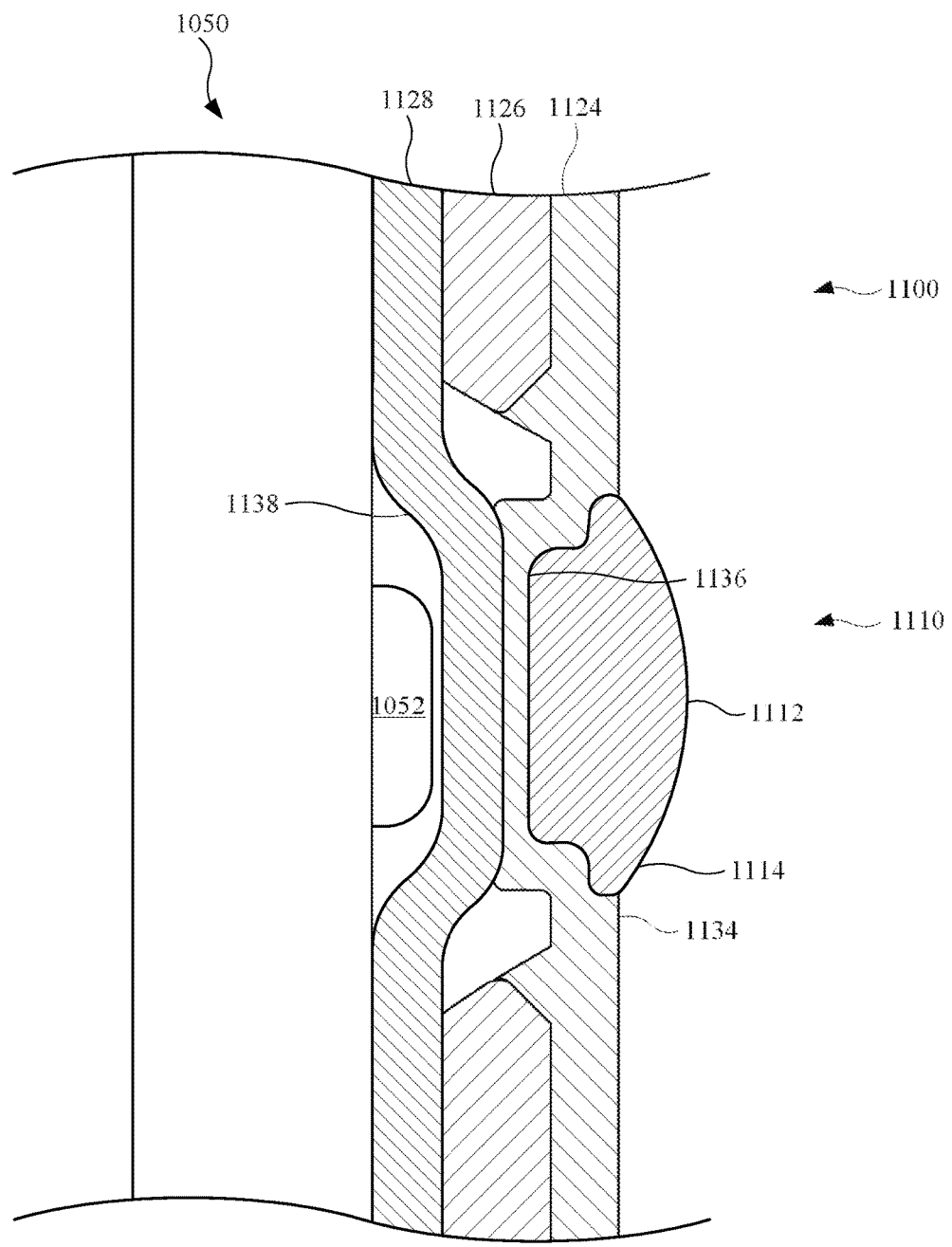
FIG. 10 illustrates a cross-sectional view of a third exemplary button cover region on a protective accessory case according to various embodiments of the present disclosure.

FIG. 10 illustrates a cross-sectional view of a third exemplary button cover region on a protective accessory case according to various embodiments of the present disclosure. As shown, an electronic device 1050 may include a button 1052, along with an accessory case 1100 designed to cover the electronic device 1050 and the button 1052. Also, the accessory case 1100 may include a button cover 1110 positioned in a location to cover the button 1052 when the electronic device 1050 is positioned in the accessory case 1100. For purposes of reference and illustration, only a portion of the electronic device 1050 and a portion of the accessory case 1100 are shown.

The region for button cover 1110 can include portions of the accessory case 1100, as well as various other button cover components. The accessory case 1100 can again include an outer layer 1124, an internal layer 1126, and a microfiber lining 1128. The internal layer 1126 may include an opening to accommodate the button cover 1110, while the microfiber lining 1128 may include a flexure region 1138 that flexes and moves with the button cover 1110. The outer layer 1124 continues through the button cover 1110 and as such does not include an opening, but does have features to accommodate the button cover 1110. In various embodiments, the outer layer 1124 can similarly be formed from silicone or a suitable thermoplastic material, while the internal layer 1126 may include a more rigid material.

The button cover 1110 can include an outer button cover component 1112, which can be located at and supported by the outer layer 1124, and can be the primary component to facilitate actuation of the button 1052 of the electronic device 1050. As such, the outer button cover component 1112 is designed to accept a user input and facilitate transfer of the user input to actuate the button 1052. The outer button cover component 1112 is designed to move with respect to the button 1152 by passing through an opening in the internal layer 1126. The outer layer 1124 may include a web region 1134 surrounding the button cover 1010. The web region 1134 can represent a relatively thin portion of the outer layer 1124 such that the button cover 1110 can readily flex and move when a force is applied to the button cover 1110 to actuate the button 1052.

As shown in FIG. 10, the outer button cover component 1112 can be a separate part from the outer layer 1124, and can be glued, press fit, and/or otherwise affixed within a recess 1136 in the outer layer 1124. Unlike the foregoing embodiment, there is no opening, or through hole, through the outer layer 1124 at the recess 1136, and there are no additional polycarbonate or other button cover components. Rather, a flange 1114 extends around the circumference of the outer button cover component 1112 can be used to provide extra features and a stepped surface geometry in order for the outer button cover component 1112 to be more firmly press fit, glued, or otherwise affixed within the outer layer 1124 at the recess 1136. In this regard, the continuous nature of the outer layer 1124 can be shaped to accommodate the exact shape of the outer button cover component 1112 as shown.

As in the previous embodiment, the outer button cover component 1112 can include a different color and/or contrast, and can also have a somewhat different feel or texture than the outer layer 1124, since the outer button cover component 1112 is physically separate from the outer layer 1124, and can be made separately. Such differences can again be used to enhance the overall aesthetic appearance of the accessory case 1100. In various embodiments, the outer button cover component 1112 may include a silicone or thermoplastic material that is the same or similar to the material of the outer layer 1124, such that these parts can be similar yet distinguishable, such as by having different colors or contrasts. A silicone-to-silicone adhesive may be used to adhere outer button cover component 1112 to the outer layer 1124, as detailed below.

Figure 11:
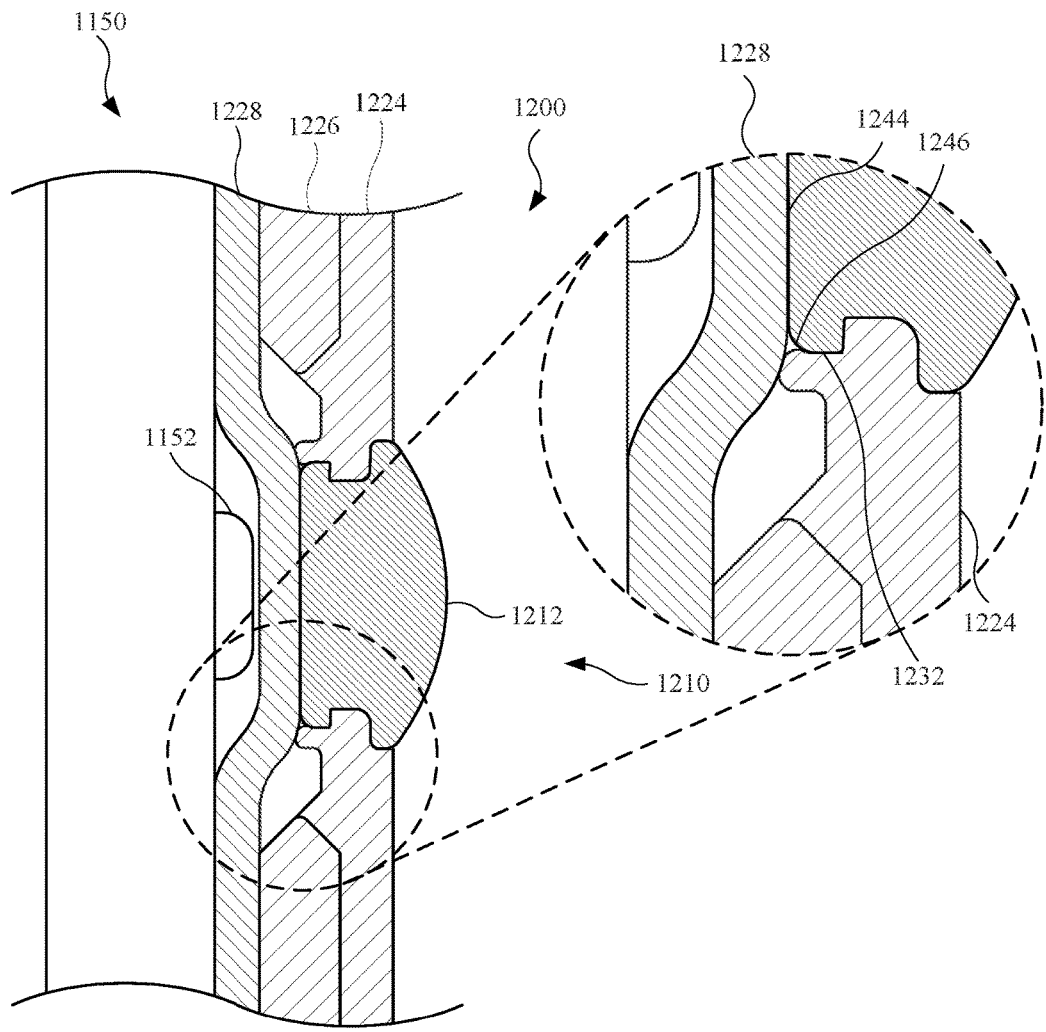
FIG. 11 illustrates a cross-sectional view an alternative arrangement for the third exemplary button cover region of FIG. 10 according to various embodiments of the present disclosure.

FIG. 11 illustrates a cross-sectional view of an alternative arrangement for the third exemplary button cover region of FIG. 10 according to various embodiments of the present disclosure. As shown, an electronic device 1150 may include a button 1152, along with an accessory case 1200 designed to cover the electronic device 1150 and the button 1152. Also, the accessory case 1200 may include a button cover 1210 positioned in a location to cover the button 1152 when the electronic device 1150 is positioned in the accessory case 1200. Also, the accessory case 1200 may include an outer layer 1224, an internal layer 1226, and a microfiber lining 1228. For purposes of reference and illustration, only a portion of the electronic device 1150 and a portion of the accessory case 1200 are shown.

The accessory case 1200 can be substantially similar to the accessory case 1100 (shown in FIG. 10), with some alternative features. For example, as shown in the enlarged view, the button cover 1210 may include an outer button cover component 1212 that includes a rear portion 1244 extending through an opening of the outer layer 1224 and abutting the microfiber lining 1228. The outer button cover component 1212 may further include an interlocking flange 1246 that extends into a gap 1232 in the outer layer 1224. The interlocking flange 1246 can snap into place within the gap 1232 during assembly, thereby providing an additional mechanical locking function to prevent failure or removal of the outer button cover component 1212 from the outer layer 1224. Some of the gap 1232 may remain unfilled, so as to provide flow or runoff for adhesive that is used to adhere the outer button cover component 1212 to the outer layer 1224 and/or to the microfiber lining 1228. As an alternative embodiment, the outer button cover component 1212 and the outer layer 1224 may be co-molded in a different process of formation.

FIGS. 12A-12D illustrate a block diagram format of a manufacturing process used to form the third exemplary button cover region shown in FIG. 11, according to various embodiments of the present disclosure. As noted above, a silicone-based adhesive can be used to adhere a silicone outer button cover component to a separate silicone outer layer, such as within a recess of the silicone outer layer. This silicone-based adhesive can be, for example, a two-part glue comprising a catalyst and a polymer that are mixed together, resulting in a time-sensitive ability to apply the adhesive to adhere the silicone parts together. The manufacturing process 1260 can include a track 1270 that shuttles an accessory case 1250 atop an expandable buck 1272 for processing from station to station. In some embodiments, the accessory case 1250 may be processed as a whole, while in other embodiments only a portion or layer of the accessory case 1250 may be processed. For example, the manufacturing process 1260 might be performed only to an outer layer before that layer is then adhered to any other portions of the accessory case 1250.

Figure 12A:
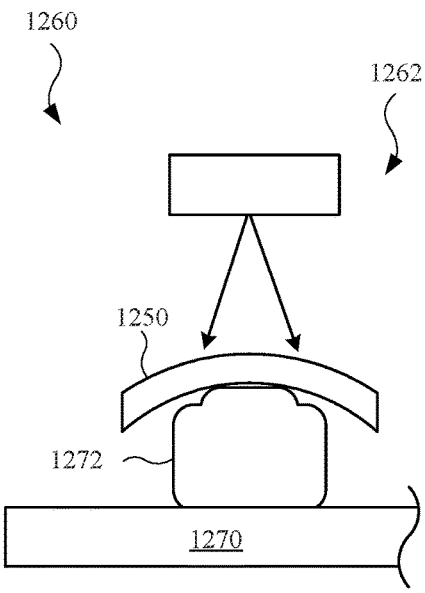
FIG. 12A illustrates a first station in the manufacturing process that includes activating a region of an outer surface of the accessory case or a suitable part thereof, according to various embodiments of the present disclosure.
Figure 12B:
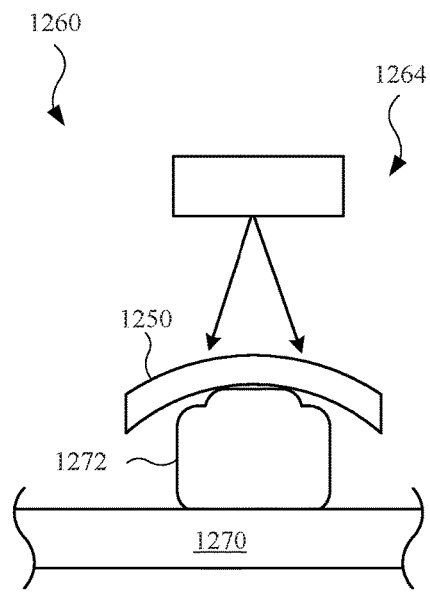
FIG. 12B illustrates a second station in the manufacturing process that includes dispensing glue or another suitable adhesive to the activated region of the outer surface of the accessory case, according to various embodiments of the present disclosure.
Figure 12C:
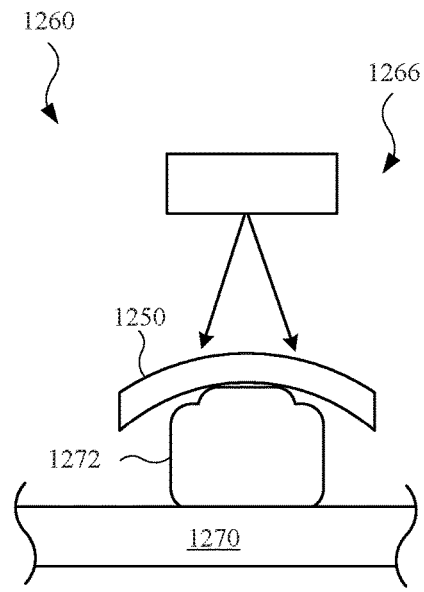
FIG. 12C illustrates a third station in the manufacturing process that includes loading a suitable outer button cover component to the activated region of the accessory case that includes the adhesive, according to various embodiments of the present disclosure.
Figure 12D:
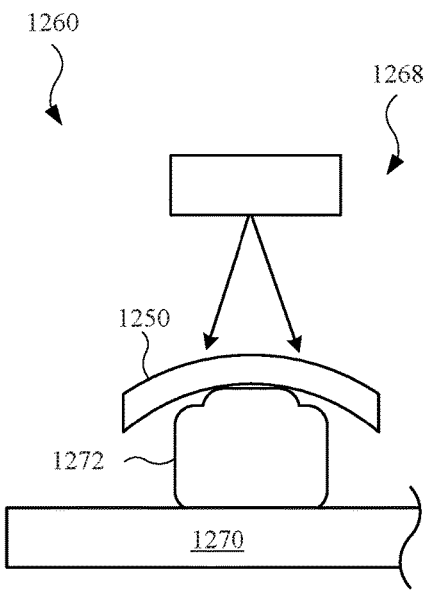
FIG. 12D illustrates a fourth station in the manufacturing process that includes applying heat and pressure to the outer button cover component and activated region of the accessory case, according to various embodiments of the present disclosure.

FIG. 12A illustrates a first station 1262 in the manufacturing process 1260 that may include activating a region of an outer surface of the accessory case 1250 or a suitable part thereof. This can be done by way of a cleaning, a plasma discharge, a laser sanding, or any other activation method that may be suitable for the material of the outer surface. The activated region may include the bottom and walls of a recess in an outer layer of the accessory case 1250, such as in the case of the recess 1136 in outer layer 1124 in the embodiment shown and described in FIG. 10. FIG. 12B illustrates a second station 1264 in the manufacturing process 1260 that may include dispensing glue or another suitable adhesive to the activated region of the outer surface of the accessory case 1250. FIG. 12C illustrates a third station 1266 in the manufacturing process 1260 that may include loading a suitable outer button cover component to the activated region of the accessory case 1250 that includes the adhesive. This loading can involve the use of a vacuum hold, and can involve inserting the outer button cover component 1112 into recess the 1136 (shown in FIG. 10). FIG. 12D illustrates a fourth station 1268 in the manufacturing process 1260 that may include applying heat and pressure to the outer button cover component and activated region of the accessory case 1250, which can activate the glue or adhesive in order to affix the outer button cover component to the outer surface, such as at the recess. It should be noted that the track 1270 depicted in FIGS. 12A-12D may include a continuous track that includes each of the aforementioned stations.

While the foregoing exemplary embodiments can be applied to accessory cases and button covers that are all formed from silicone or a similarly molded material, other accessory case embodiments may involve the use of other materials. In various further embodiments detailed below, the outer layer of the accessory case may include a leather or cloth material, and the button covers may include metal, such as aluminum or steel.

Figure 13:
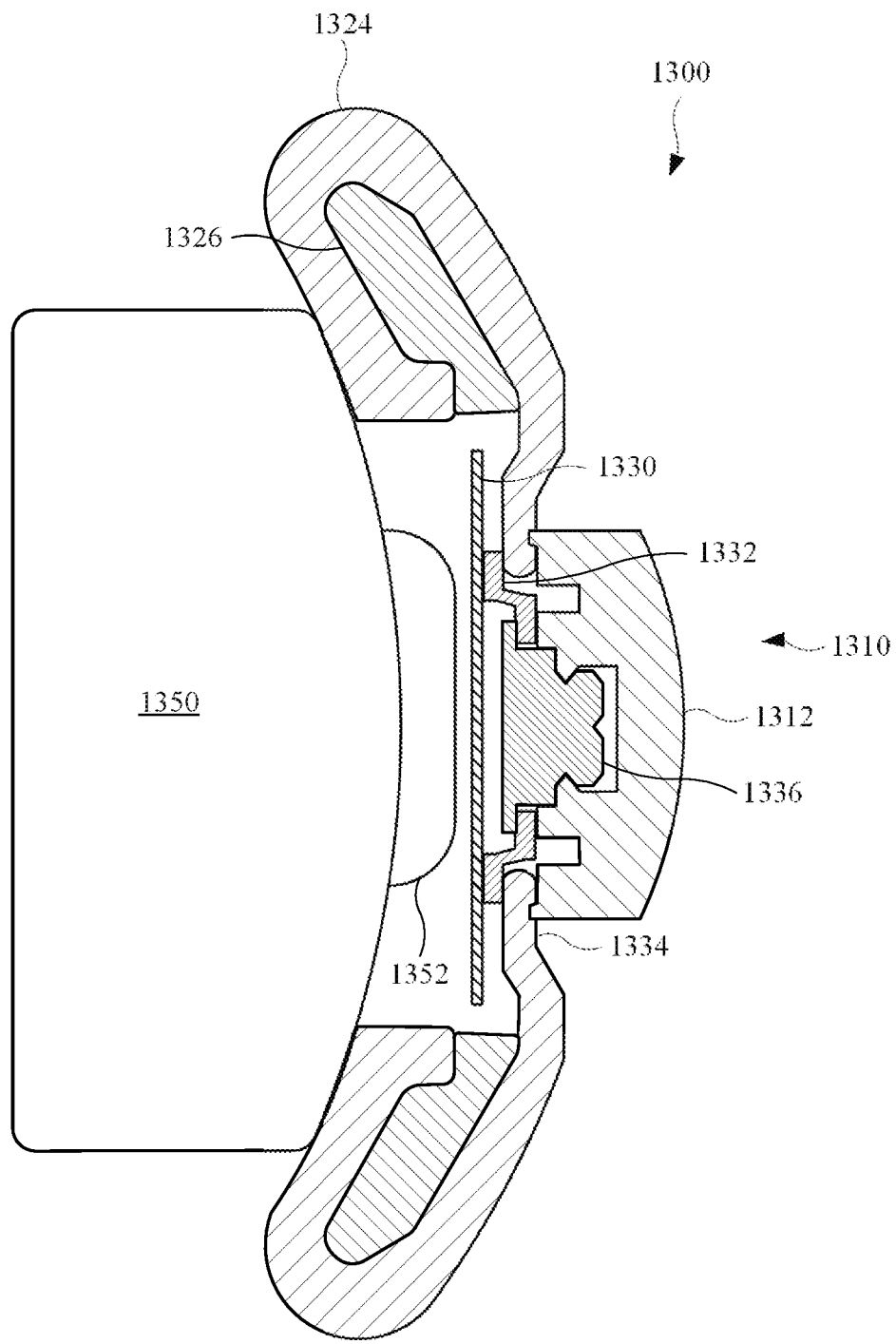
FIG. 13 illustrates a cross-sectional view of a fourth exemplary button cover region on a protective accessory case, according to various embodiments of the present disclosure.

FIG. 13 illustrates a cross-sectional view of a fourth exemplary button cover region on a protective accessory case, according to various embodiments of the present disclosure. Similar to the forgoing exemplary embodiments, the accessory case 1300 shown in FIG. 13 may include a button cover 1310 as well as various components designed to contain an electronic device 1350 having a button 1352.

Again, only a portion of the electronic device 1350 and a portion of the accessory case 1300 are shown for illustrative and reference purposes. As in the foregoing examples, the region for the button cover 1310 can include portions of the accessory case 1300, as well as various other button cover components. The accessory case 1300 can include at least an outer layer 1324 and an internal layer 1326, the latter of which can be formed from a relatively rigid material and may include an opening therethrough to accommodate the button cover 1310. Also, similar to the foregoing embodiments, the button cover 1310 can include an outer button cover component 1312 located at, and supported by, the outer layer 1324, and can be the primary component to facilitate actuation of the button 1352. Accordingly, the outer button cover component 1312 is designed to accept a user input and facilitate transfer of the user input to actuate the button 1352 of the electronic device 1350. Also, the outer button cover component 1312 is designed to move with respect to the button 1352, such as through an opening in the internal layer 1326. Also, the outer layer 1324 may include a web region 1334 surrounding the outer button cover component 1312. The web region 1334 can represent a relatively thin portion of the outer layer 1324 such that the button cover 1310 can readily flex and move when a force is applied to the button cover 1310 to actuate the button 1352.

In some embodiments, the outer layer 1324 may include leather, cloth, or another suitable soft material, while the outer button cover component 1312 can be a separate part that is formed from a metal material, such as aluminum or anodized aluminum. The anodized aluminum or other metal may be dyed or otherwise colored to create a wide range of potential colors for the outer button cover component 1312, the color of which can be different than the color of the outer layer 1324, which may also be dyed or otherwise colored separately. While an optional microfiber lining may be included if desired, the outer layer 1324 can alternatively wrap around the internal layer 1326 in a continuous fashion to form an inner layer of the accessory case 1300. The outer layer 1324 can also have different openings at its outer and inner layers to accommodate the button cover 1310. As shown, the opening at the inner layer, or inner portion, of outer layer 1324 can be larger than the opening at the outer layer, or outer portion, that receives the outer button cover component 1312, so as to minimize thickness stack up at the location of the outer button cover component 1312. The button cover 1310 can also include several additional parts that are separate from the accessory case 1300. In addition to the outer button cover component 1312, a cosmetic label 1330 can be used to cover a backing plate 1332 and a fastener 1336. The backing plate 1332 and the fastener 1336 may be used to attach the outer button cover component 1312 to the web region 1334 of the outer layer 1324. Also, in some embodiments, the fastener 1336 includes a self-clinching fastener.

Figure 14:
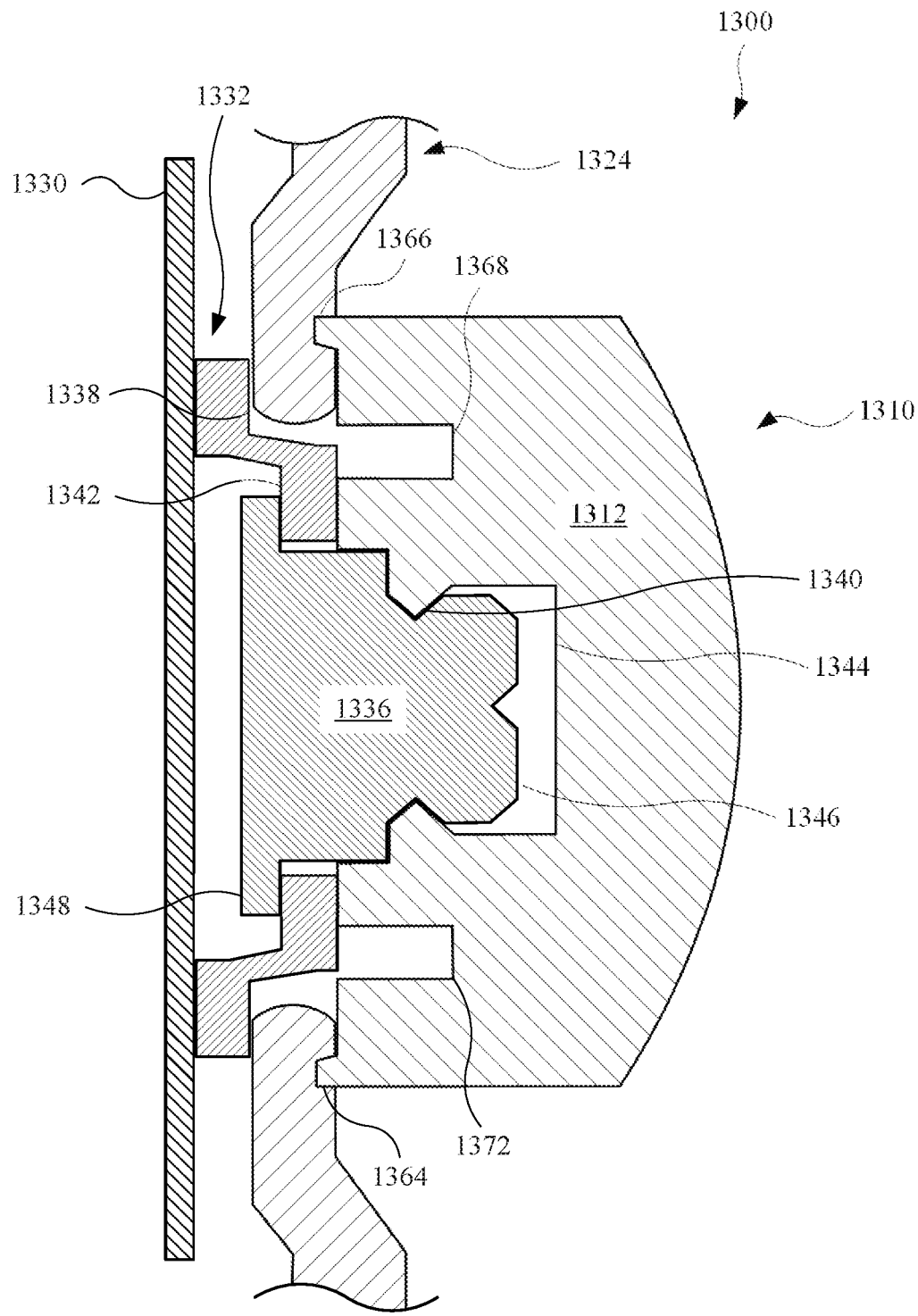
FIG. 14 illustrates a cross-sectional close-up view of the button cover of the accessory case shown in FIG. 13, further showing additional features.

FIG. 14 illustrates a side cross-sectional close-up view of the button cover 1310 of the accessory case 1300 shown in FIG. 13, further showing additional features. Some features shown and described in FIG. 14 may facilitate an attachment of the outer button cover component 1312 with the outer layer 1324. The backing plate 1332 may be located over the opening at an inner surface of the outer layer 1324. The backing plate 1332 may include steel and may include a thickness of about 0.2 mm, for example. The backing plate 1332 may include a first region 1338 that contacts the outer layer 1324 around the opening. The backing plate 1332 may also include a second region 1342 that extends into the opening and contacts a surface of the outer button cover component 1312. Also, as shown, an edge of the outer layer 1324 is compressed between the first region 1338 of the backing plate 1332 and the outer button cover component 1312.

The fastener 1336 may include an extension 1346 that extends into a cavity 1344 of the outer button cover component 1312. The fastener 1336 may further include a flange 1348 extending around an outer peripheral portion of the fastener 1336. The flange 1348 can include a size large enough to cover the opening and compress the second region 1342 of the backing plate 1332 against the outer button cover component 1312. During assembly, the fastener 1336 can be compressed against the backing plate 1332 and into the cavity 1344. Alternatively, the outer button cover component 1312 can be compressed at the cavity 1344 onto the backing plate 1332 and the fastener 1336. For example, as shown in FIG. 14, when a compression force is applied to fit the outer button cover component 1312 onto the fastener 1336, the outer button cover component 1312 (formed from a relatively soft metal, such as aluminum) can deform into an undercut region 1340 of the fastener 1336. As a result, the outer button cover component 1312, once deformed, can interlock with the fastener 1336 at the undercut region 1340, thereby limiting or preventing removal of the outer button cover component 1312 from the fastener 1336. A compression force of about 750 Newtons ("N") can be used in either arrangement. The compression force can also cause the backing plate 1332 to deform from a more planar, or flat, shape into the stepped shape shown in FIG. 14, and can also cause the fastener 1336 and/or the internal walls of the cavity 1344 in the outer button cover component 1312 to deform. This can take place at a tapered region of the outer button cover component 1312, for example, and can result in deformed materials that create a press fit attachment between the fastener 1336 and the outer button cover component 1312. In some embodiments, the backing plate 1332 can be at least partially stepped as its original configuration. A cosmetic label 1330, such as a polyethylene terephthalate ("PET") film mask, can be adhered to the back of the backing plate 1332 and/or outer layer 1324, so as to cover this attachment arrangement at an interior location of the button cover 1310. In some embodiments, the fastener 1336 includes a PEM® fastener.

While these attachment features can function to affix the outer button cover component 1312 to the outer layer 1324 effectively, another feature can also be used to limit relative shifting between these parts. For example, the outer button cover component 1312 may include a first rib 1364 and a second rib 1366, each of which extending from the outer button cover component 1312. In some embodiments, the first rib 1364 and the second rib 1366 extend into the outer layer 1324 (when, for example, the outer layer 1324 includes leather) during the compressive assembly of button cover 1310, thereby further affixing the outer button cover component 1312 to the outer layer 1324 and also preventing or limiting relative side-to-side shifting of these parts.

In addition to the foregoing attachment features, the outer button cover component 1312 may include grooves, such as a first groove 1368 and a second groove 1372, or similar openings. These grooves can function to direct stresses toward these grooves during a finishing operations to, or performing a deformable attachment of, the outer button cover component 1312. Such stresses caused by these processes can cause cracking and other imperfections to outer, or visible, surfaces of the outer button cover component 1312. However, these cracks and imperfections can occur at or near the first groove 1368 and/or the second groove 1372 at a non-visible location(s) rather than at the more cosmetic and visible exterior surface of the outer button cover component 1312.

When the fastener 1336 includes a self-clinching fastener, the button cover 1310 may include a relatively low profile. Other alternative arrangements can also be used to attach the outer button cover component 1312 with the outer layer 1324. For example, in some embodiments (not shown), a threaded screw can be used to lock the outer layer 1324 to a threaded cavity in the outer button cover component 1312.

Figure 15:
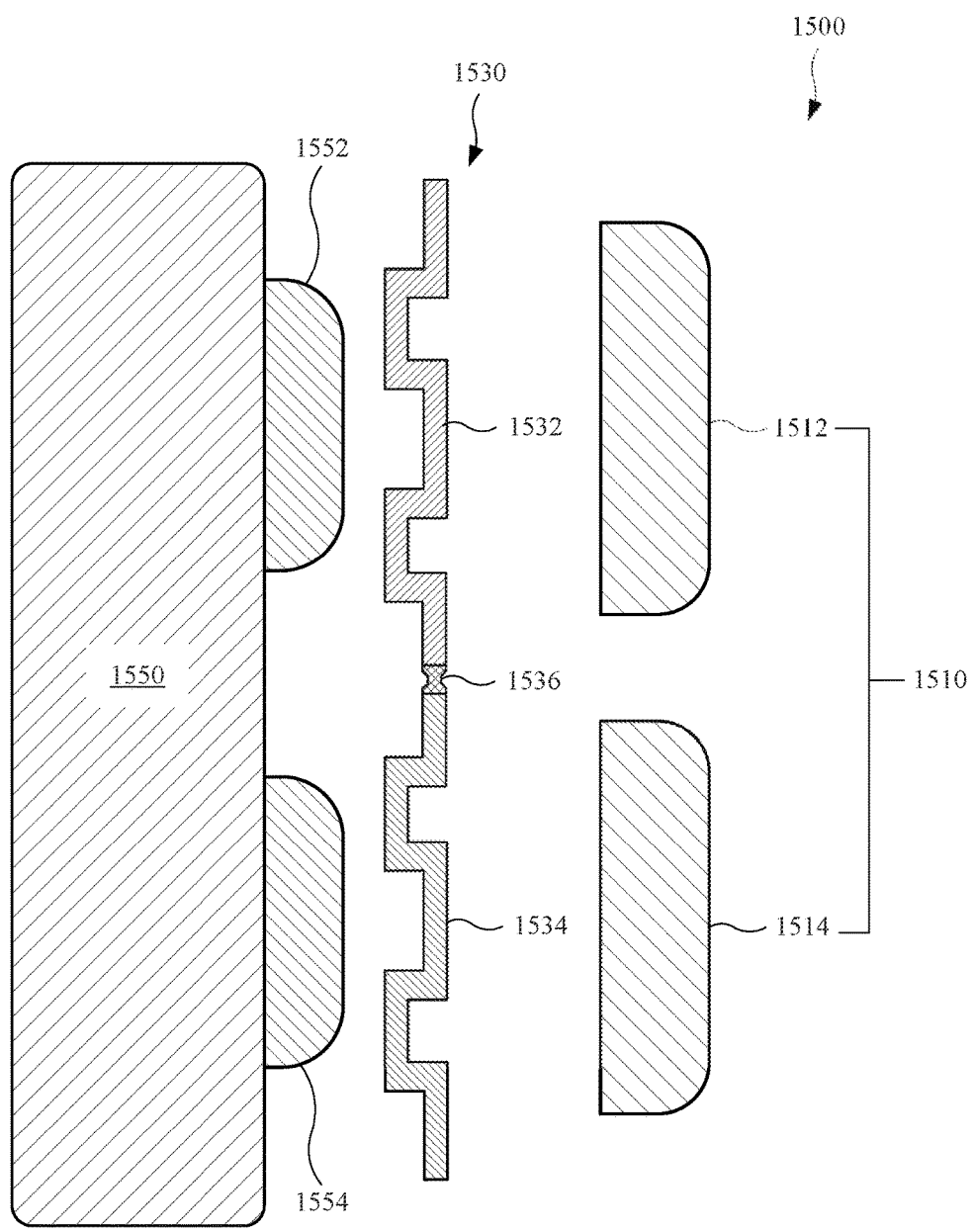
FIG. 15 illustrates a cross-sectional view of an exemplary button cover region for multiple adjacent buttons on a protective accessory case according to various embodiments of the present disclosure.

FIG. 15 illustrates a cross-sectional view of an exemplary button cover region for multiple adjacent buttons on a protective accessory case according to various embodiments of the present disclosure. As shown, an electronic device 1550 may include multiple buttons, such as a first button 1552 and a second button 1554. These buttons may provide controls for the electronic device 1550 including, but not limited to, volume up and volume down. In order to accommodate the buttons, the accessory case 1500 may include a dual button cover 1510. In this regard, the dual button cover 1510 may include a first outer button cover component 1512 and a second outer button cover component 1514.

FIG. 15 further shows the accessory case 1500 having a dual backing plate 1530. As shown, the dual backing plate 1530 includes a first backing plate 1532 and a second backing plate 1534 for the first outer button cover component 1512 and the second outer button cover component 1514, respectively. The first backing plate 1532 can be substantially similar to the second backing plate 1534. Also, the first backing plate 1532 can be separate from, but secured with, the second backing plate 1534 by a connector 1536. Further, each of the first backing plate 1532 and the second backing plate 1534 may include a dimensional difference from that of the connector 1536. For example, while each of the first backing plate 1532 and the second backing plate 1534 may include a thickness of approximately 0.2 mm, the connector 1536 may include a thickness of approximately 0.1 mm. This reduced thickness at connector 1536 can allow the first backing plate 1532 to remain coupled with the second backing plate 1534 while reducing undesirable "cross-talk" or carryover failures between the different buttons (such as the first button 1552 and the second button 1554) and button cover components (such as the first outer button cover component 1512 and the second outer button cover component 1514). Alternatively, the connector 1536 may include a spring geometry that coordinates alignment between the first backing plate 1532 and the second backing plate 1534 while reducing undesirable effects between buttons and button cover components.

In some embodiments, the first backing plate 1532, the second backing plate 1534, and the connector 1536 include a metal, such as steel or an alloy that includes steel. However, to further facilitate improved functionality of the first backing plate 1532 and the second backing plate 1534, the connector 1536 may be formed from metal having a hardness that is less than that of the first backing plate 1532 and the second backing plate 1534. In other words, the connector 1536 may be softer than the first backing plate 1532 and the second backing plate 1534. One process for changing the hardness of the connector is to apply heat, by an annealing process, as a non-limiting example, to the connector 1536 while attaching the first backing plate 1532 and the second backing plate 1534 with the connector 1536 to form the dual backing plate 1530. In particular, the process may include applying heat to the connector 1536 by an amount and/or a time greater than an amount and/or a time to the first backing plate 1532 and the second backing plate 1534.

The dual backing plate 1530 is designed to assist in attaching both of the first outer button cover component 1512 and the second outer button cover component 1514 with a layer of the accessory case 1500, such as an outer layer (not shown). Although two different backing plates, similar to the dual backing plate 1530, could be used for the first button 1552 and the second button 1554, the deformable nature of the dual backing plate 1530 during assembly and use can result in slight variations in the attachment depths, alignments, and orientation angles of the first outer button cover component 1512 and/or the second outer button cover component 1514, when these outer button components are attached with the dual backing plate 1530. For example, when the first backing plate 1532 is deformed differently from, or experiences a failure mode differently than, the second backing plate 1534, then the overall appearance of the first outer button cover component 1512 can be different, or "off," with respect to depth, alignment, and/or orientation angle as compared to the second outer button cover component 1514. However, use of the dual backing plate 1530, which forms a continuous structure by way of the connector 1536 attaching the first backing plate 1532 with the second backing plate 1534, can result in coordinating an alignment between the first outer button cover component 1512 and the second outer button cover component 1514, and eliminating or reducing offsets.

Alternatively, in some embodiments, the dual backing plate 1530 may include a steel or other metal that is relatively softer (e.g., half as hard) than that of the steel or other metal used for the backing plate 1332 (shown in FIG. 14). In various embodiments, a given accessory case can include the backing plate 1332 (shown in FIG. 14) that is relatively harder at single button cover location (such as the outer button cover component 1112, shown in FIG. 14) and also the dual backing plate 1530 that is relatively softer, with the dual backing plate 1530 located over a double button cover location on the accessory case, such as a location associated with the first outer button cover component 1512 and the second outer button cover component 1514.

Figure 16:
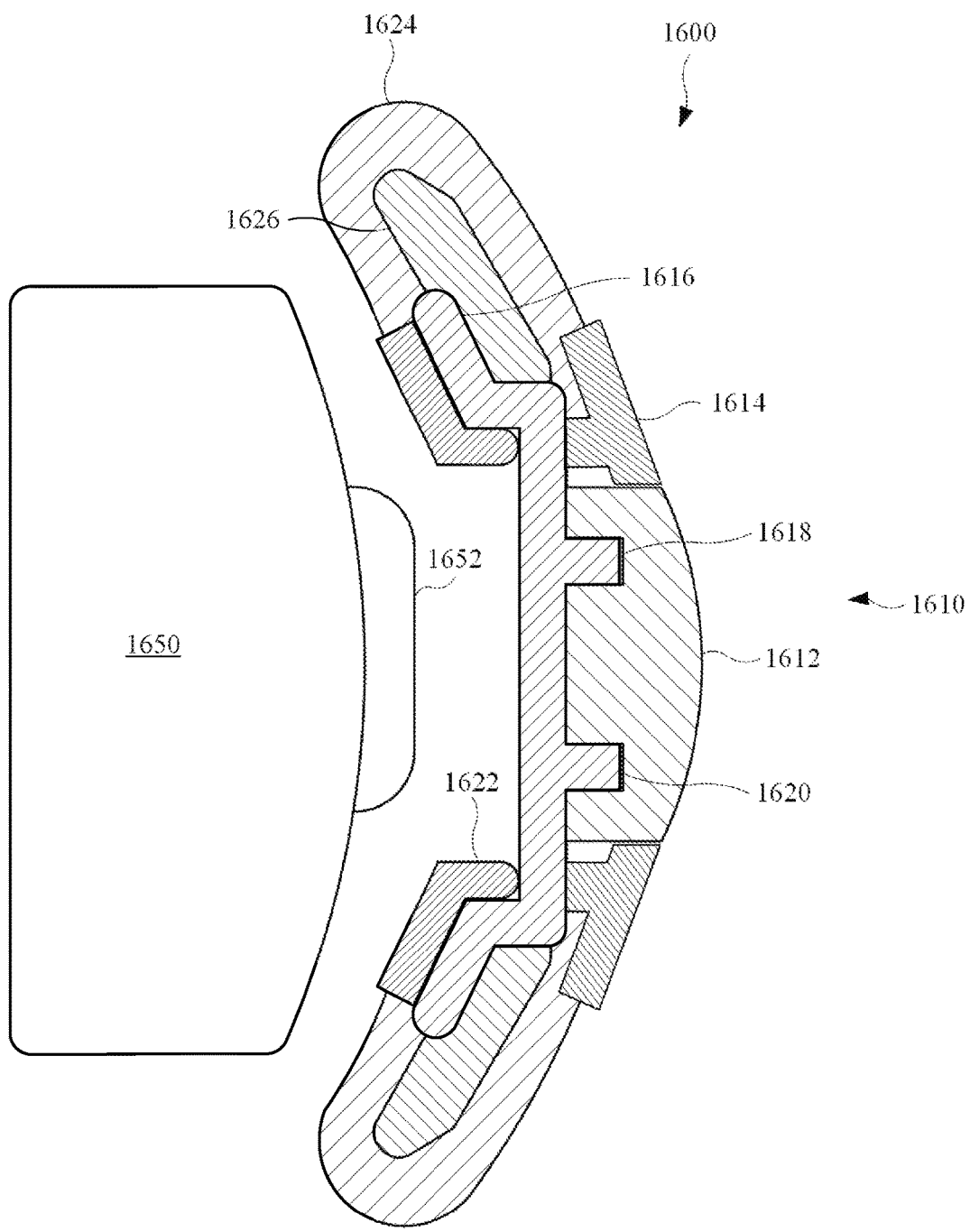
FIG. 16 illustrates a cross-sectional view of a fifth exemplary button cover region on a protective accessory case according to various embodiments of the present disclosure.

FIG. 16 illustrates a cross-sectional view of a fifth exemplary button cover region on a protective accessory case according to various embodiments of the present disclosure. As shown, an accessory case 1600 may include a button cover 1610 having an outer button cover component 1612. In some embodiments, the outer button cover component 1612 includes a metal. The accessory case 1600 may also include an outer layer 1624 having an opening that receives the outer button cover component 1612. In some embodiments, the outer layer 1624 includes leather. The outer layer 1624 can wrap around an internal layer 1626 (which may include plastic or a hard polycarbonate material, as non-limiting examples), and the outer layer 1624 and the internal layer 1626 can collectively form the accessory case 1600. The accessory case 1600 may include a size and shape to accommodate an electronic device 1650 and a button 1652 of the electronic device 1650. However, for purposes of simplicity and illustration, only a portion of the accessory case 1600 and only a portion of the electronic device 1650 are shown.

The button cover 1610 can be referred to as a "sandwich trim" arrangement, which includes some differing components with respect to the prior examples. For example, the button cover 1610 may include a trim element 1614 positioned around a perimeter of the outer button cover component 1612 and can be attached to the outer layer 1624. In some embodiments, the trim element 1614 includes a metal. During a button actuation event in which a force is applied to of the outer button cover component 1612, the trim element 1614 remains fixed against the outer layer 1624, while the outer button cover component 1612 moves in a direction toward the button 1652 in order to actuate the button 1652.

The button cover 1610 may further include a compliant membrane 1616 designed to facilitate movement of the outer button cover component 1612 by flexing during the button actuation event. The compliant membrane 1616 may include an elastomer material and can bond to various components. The elastomer material may extend into cavities, such as a first cavity 1618 and a second cavity 1620, of the outer button cover component 1612 and contact exposed surfaces of the internal layer 1626 and a supporting element 1622. In effect, the compliant membrane 1616 can be sandwiched between the outer button cover component 1612 and the supporting element 1622. The compliant membrane 1616 can also mechanically stop against an extension of the trim element 1614 when the compliant membrane 1616 is not flexed. Accordingly, the compliant membrane 1616 may flex away from the trim element 1614 when the outer button cover component 1612 is actuated, which also causes actuation of the trim element 1614. The compliant membrane 1616 may be bonded to these various components by an adhesive, as may be suitable. In some embodiments, the outer button cover component 1612 may include flanges (not shown) extending away from a surface of the outer button cover component 1612 that interfaces the compliant membrane 1616. The flanges can create a hard mechanical stop against a surface of the trim element 1614 when the outer button cover component 1612 is in an un-actuated, or resting, position. Such flanges can also prevent removal of the outer button cover component 1612 from the accessory case 1600.

The supporting element 1622 may include a plastic material. Also, the supporting element 1622 may be relatively rigid so as to limit or prevent moving or flexing, and can be coupled to the internal portion of the outer layer 1624 as shown, such that the outer layer 1624 also does not move or flex. Accordingly, compliance of leather or another soft material forming the outer layer 1624 is not needed in order for a button actuation event.

Figure 17:
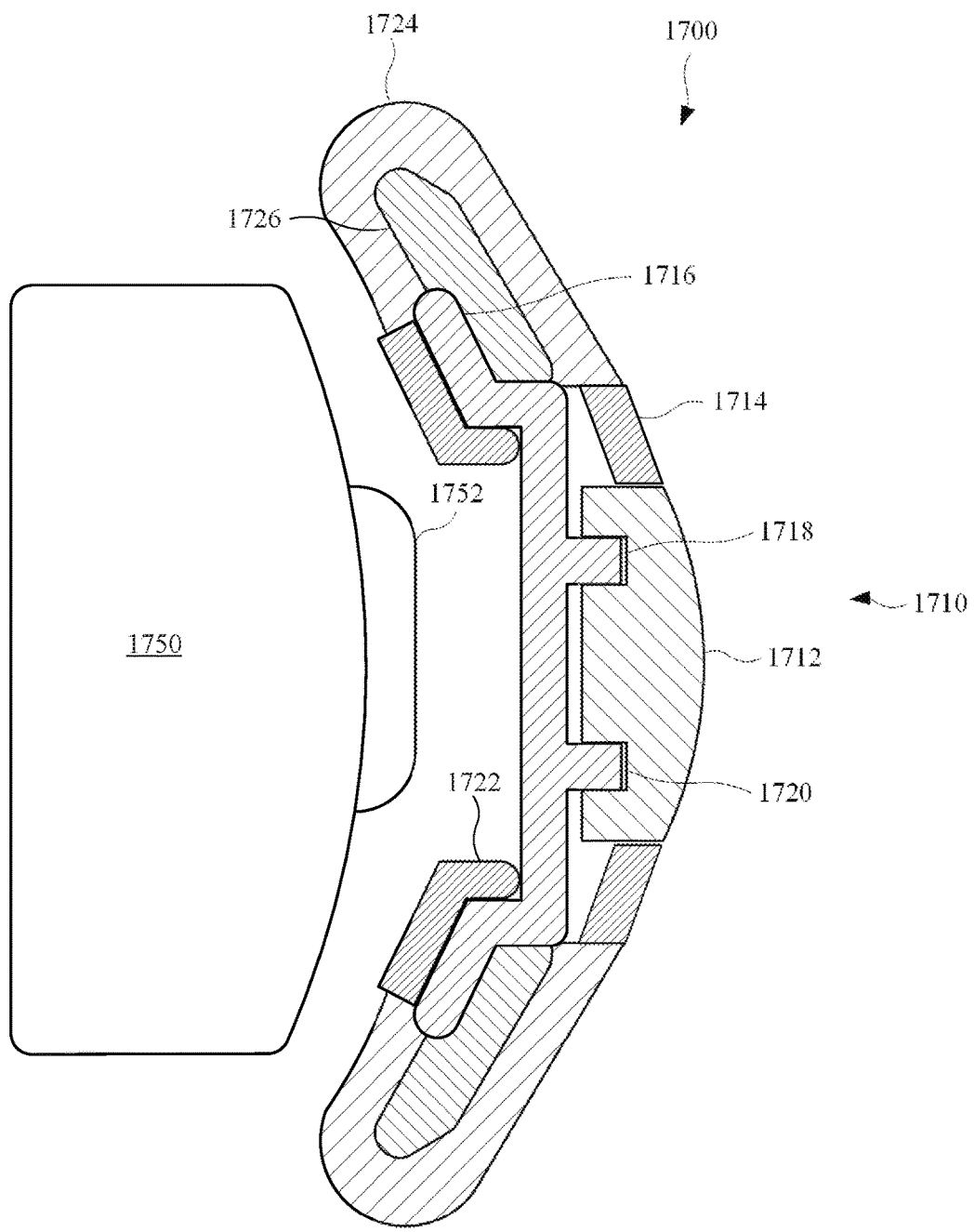
FIG. 17 illustrates a cross-sectional view of an alternative arrangement for the fifth exemplary button cover region according to various embodiments of the present disclosure.

FIG. 17 illustrates a cross-sectional view of an alternative arrangement for the fifth exemplary button cover region according to various embodiments of the present disclosure. As shown, an accessory case 1700 may include a button cover 1710 having an outer button cover component 1712. In some embodiments, the outer button cover component 1712 includes a metal. The accessory case 1700 may also include an outer layer 1724 having an opening that receives the outer button cover component 1712. In some embodiments, the outer layer 1724 includes leather. The outer layer 1724 can wrap around an internal layer 1726 (which may include plastic or a hard polycarbonate material, as non-limiting examples), and the outer layer 1724 and the internal layer 1726 can collectively form the accessory case 1700. The accessory case 1700 may include a size and shape to accommodate an electronic device 1750 and a button 1752 of the electronic device 1750. However, for purposes of simplicity and illustration, only a portion of the accessory case 1700 and only a portion of the electronic device 1750 are shown.

Similar to the foregoing embodiment, the accessory case 1700 may include a trim element 1714 and a compliant membrane 1716, which may include any material(s) previously described for a trim element and a compliant membrane, respectively. However, unlike the trim element 1614 (shown in FIG. 16), the trim element 1714 in FIG. 17 does not include extensions that extend to engage the compliant membrane 1716. In this regard, the compliant membrane 1716 may not provide a mechanical stop for the trim element 1714. During a button actuation event, the trim element 1714 remains fixed against the outer layer 1724, while the outer button cover component 1712 and the compliant membrane 1716 move in a direction toward the button 1752. The compliant membrane 1716 can again be formed from an elastomer material and can bond via adhesive to various components, and also extend into a first cavity 1718 and a second cavity 1720 of the outer button cover component 1712. Also, the compliant membrane 1716 may engage the internal layer 1726 and a supporting element 1722.

Figure 18:
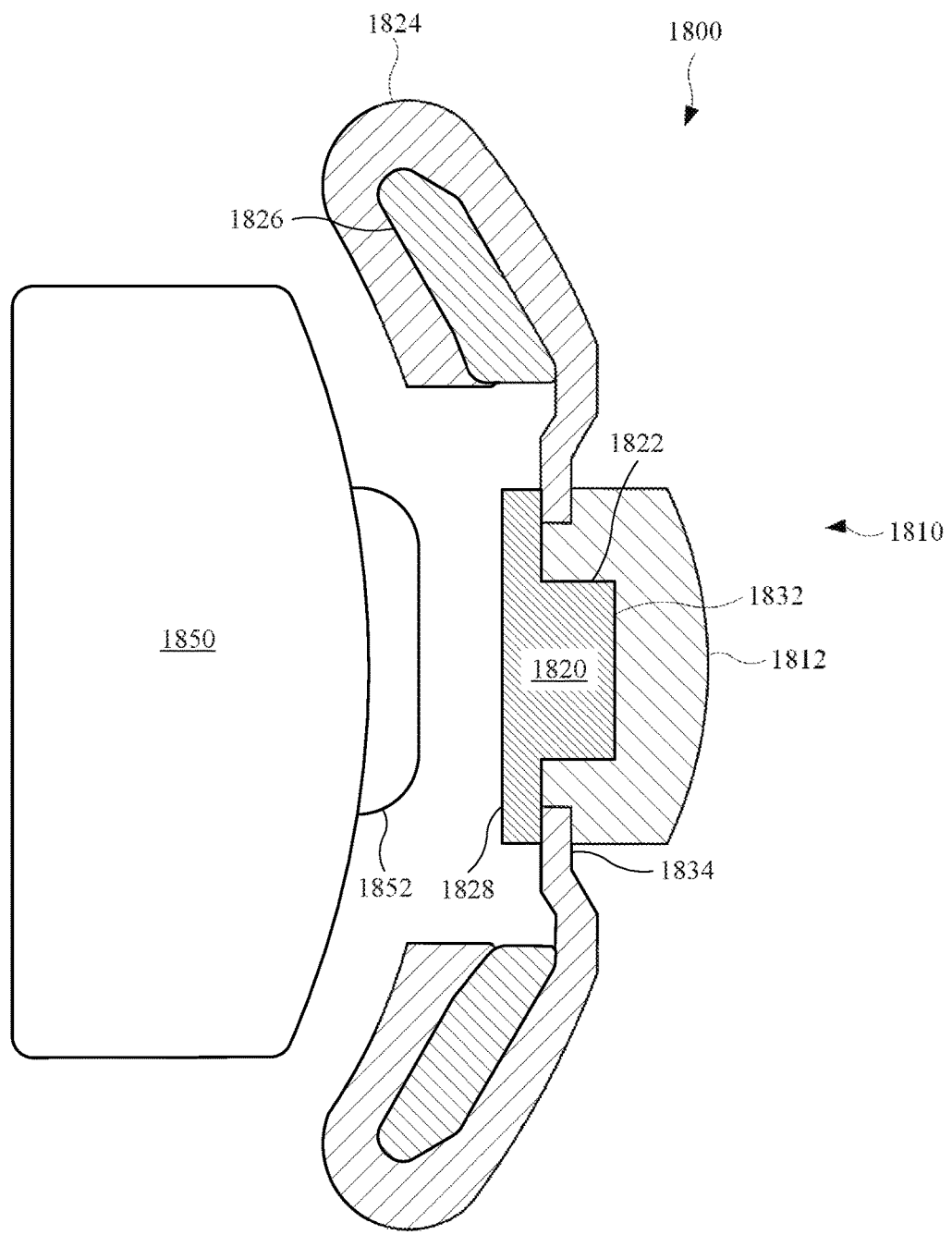
FIG. 18 illustrates a cross-sectional view of a sixth exemplary button cover region on a protective accessory case according to various embodiments of the present disclosure.

FIG. 18 illustrates a cross-sectional view of an alternative arrangement for the fifth exemplary button cover region according to various embodiments of the present disclosure. As shown, an accessory case 1800 may include a button cover 1810 having an outer button cover component 1812. In some embodiments, the outer button cover component 1812 includes a metal. The accessory case 1800 may also include an outer layer 1824 having an opening that receives the outer button cover component 1812. In some embodiments, the outer layer 1824 includes leather. The outer layer 1824 can wrap around an internal layer 1826 (which may include plastic or a hard polycarbonate material, as non-limiting examples), and the outer layer 1824 and the internal layer 1826 can collectively form the accessory case 1800. The accessory case 1800 may include a size and shape to accommodate an electronic device 1850 and a button 1852 of the electronic device 1850. However, for purposes of simplicity and illustration, only a portion of the accessory case 1800 and only a portion of the electronic device 1850 are shown.

The button cover 1810 may further include an inner button cover component 1820 that includes an insert portion 1822 positioned within a cavity 1832 of the outer button cover component 1812. The inner button cover component 1820 can also include a flange 1828, or backer portion, extending outward from the insert portion 1822. This flange 1828 can also be used in combination with the outer button cover component 1812 to compress a web region 1834 of the outer layer 1824 therebetween, thereby attaching the outer layer 1824 to the outer button cover component 1812. The inner button cover component 1820 may include a hard plastic or polycarbonate material, and can be attached to the outer button cover component 1812 by way of glue or other adhesive. Crush ribs (shown later) can also be used to facilitate the attachment between the inner button cover component 1820 and the outer button cover component 1812, as detailed below.

Figure 19A:
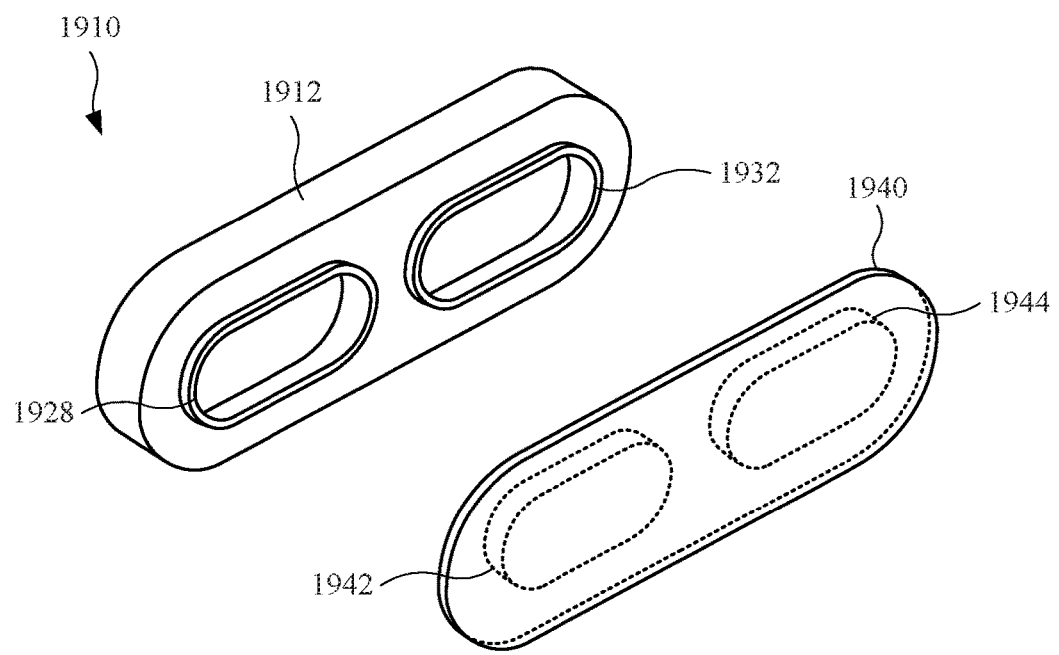
FIG. 19A illustrates an exploded view of various components according to various embodiments of the present disclosure.

FIG. 19A illustrates an exploded view of various components from of an exemplary button cover region according to various embodiments of the present disclosure. The components shown and described may be alternative components suitable for use with the accessory case 1800 (shown in FIG. 18). Accordingly, it should be understood that the button cover region may be used in conjunction with an accessory case in accordance with some described embodiments. As shown, the button cover 1910 may include an outer button cover component 1912, as well as an inner button cover component 1940 configured to mate with or otherwise attach with the outer button cover component 1912. In some embodiments, the outer button cover component 1912 includes a metal. The outer button cover component 1912 may include cavities, such as a first cavity 1928 and a second cavity 1932, partially extending into the outer button cover component 1912. The inner button cover component 1940 may include a first insert portion 1942 and a second insert portion 1944 designed to fit into the first cavity 1928 and the second cavity 1932, respectively. In this regard, the inner button cover component 1940 may couple with the outer button cover component 1912, and the inner button cover component 1940 may compress an outer layer of an accessory case (such as the outer layer 1824, shown in FIG. 18) against the outer button cover component 1912.

Figure 19B:
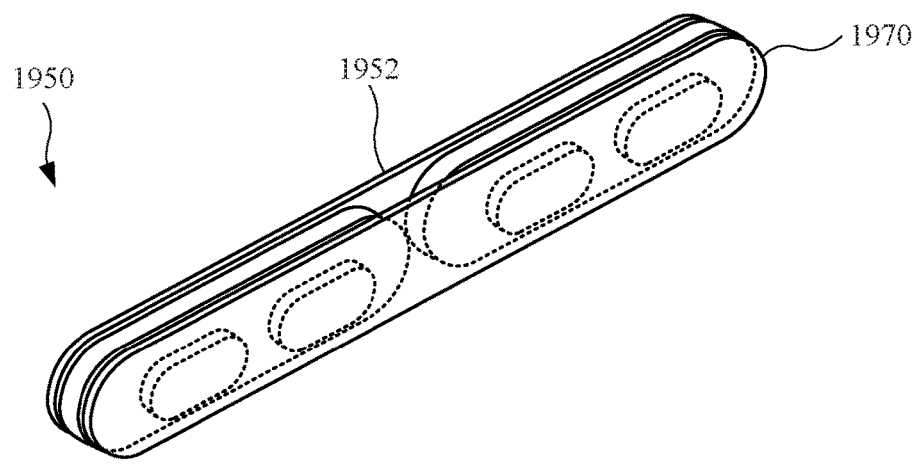
FIG. 19B illustrates a perspective view of various alternative components according to various embodiments of the present disclosure.

FIG. 19B illustrates a perspective of various alternative components according to various embodiments of the present disclosure. The components shown and described may be alternative components suitable for use with the accessory case 1800 (shown in FIG. 18). As shown, a button cover 1950 may include an outer button cover component 1952 and an inner button cover component 1970 that mates with or otherwise attaches to the outer button cover component 1952. Further, the button cover 1950 may take the form of a dual button cover that may be used with, for example, the dual backing plate 1530 (shown in FIG. 15).

Figure 20:
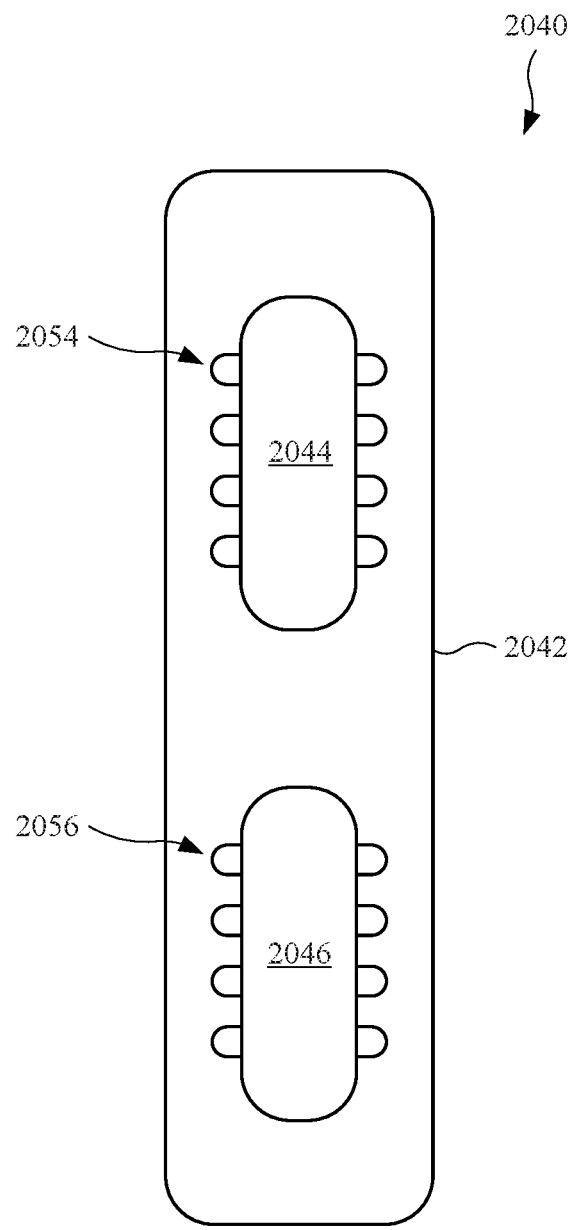
FIG. 20 illustrates a top plan view showing additional features for an exemplary button cover region according to various embodiments of the present disclosure.

FIG. 20 illustrates a top plan view showing additional features for an exemplary button cover region according to various embodiments of the present disclosure. As shown, a button cover component 2040 may include a backer portion 2042 that includes a first insert portion 2044 and a second insert portion 2046. The aforementioned insert portions are suitable for inserting into cavities on an associated outer button cover component (such as the first cavity 1928 and the second cavity 1932 of the outer button cover component 1912, shown in FIG. 19A). Each insert portion may include several crush ribs. For example, the first insert portion 2044 includes a first set 2054 of crush ribs surrounding multiple walls of the first insert portion 2044, and the second insert portion 2046 includes a second set 2056 of crush ribs surrounding multiple walls of the second insert portion 2046. When the first insert portion 2044 and the second insert portion 2046 are each inserted into a cavity of an outer button cover component, these crush ribs of each insert portion can deform to facilitate an interference fit, or press fit, with the inner walls of the cavity. As part of forming the interference fit, the walls of the cavity may also be deformed by the crush ribs. These crush ribs can be used to attach the button cover component 2040 to an associated outer button cover component. Also, glue or another adhesive may be used to facilitate the attachment.

Figure 21A:
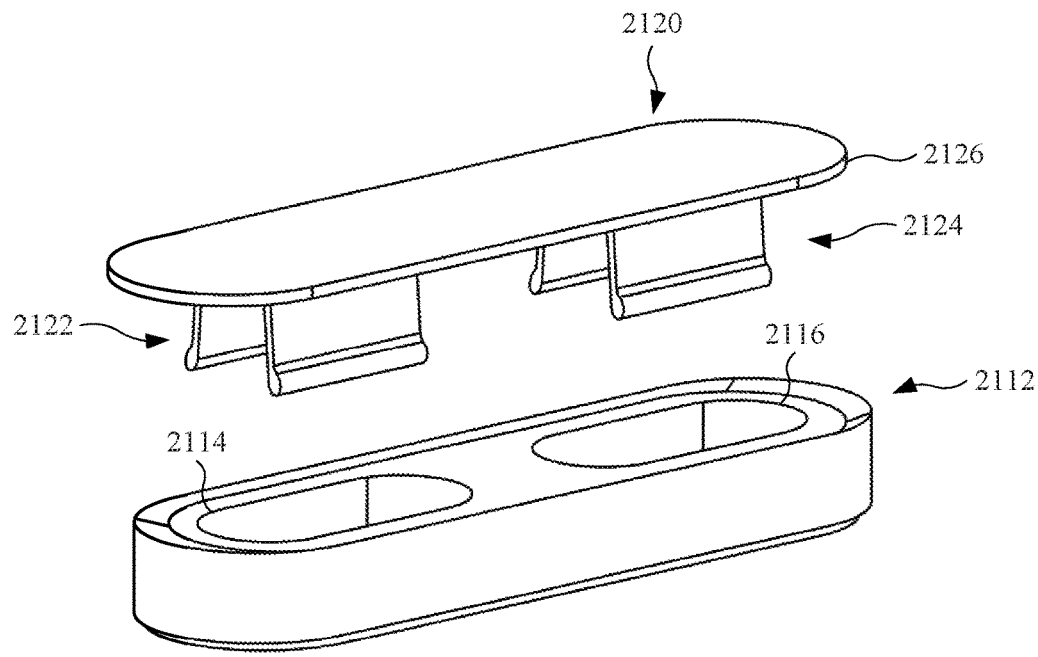
FIG. 21A illustrates an exploded view of exemplary coupling features for a button cover region according to various embodiments of the present disclosure.

FIG. 21A illustrates a front perspective of exemplary coupling features for a button cover region according to various embodiments of the present disclosure. As shown, an arrangement may include an outer button cover component 2112 designed to attach with an inner button cover component 2120. The outer button cover component 2112 may include a rigid material, such as metal. The inner button cover component 2120 may include nylon, hard plastic, or a polycarbonate material, as non-limiting examples. Also, the inner button cover component 2120 may include multiple insert portions, such as a first insert portion 2122 and a second insert portion 2124, that are coupled by a flange 2126 that provides a backing for the first insert portion 2122 and the second insert portion 2124.

The outer button cover component 2112 may include a first cavity 2114 and a second cavity 2116 designed to receive the first insert portion 2122 and the second insert portion 2124, respectively. In this regard, the first insert portion 2122 and the second insert portion 2124 can be configured to secure in a "snap fit" arrangement within the first cavity 2114 and the second cavity 2116. This will be shown below.

Figure 21B:
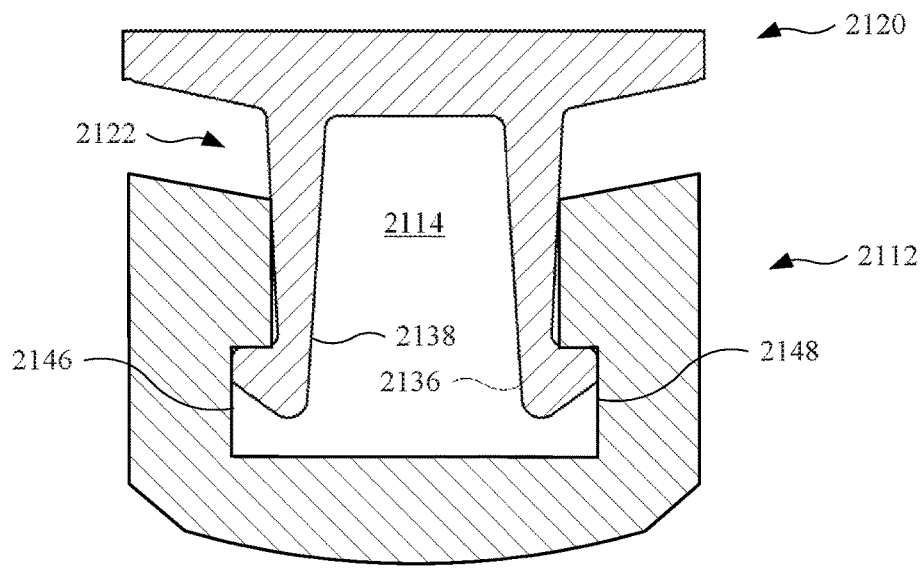
FIG. 21B illustrates a cross-sectional view of the components of FIG. 21A, showing the outer button cover component attached to the inner button cover component.

FIG. 21B illustrates a cross-sectional view of the components of FIG. 21A, showing the outer button cover component 2112 attached to the inner button cover component 2120. As shown, the first insert portion 2122 is secured with the first cavity 2114. In particular, the first insert portion 2122 may include a first tab 2136 and a second tab 2138 designed to provide the snap fit arrangement with a first recess 2146 and a second recess 2148, respectively, with the first recess 2146 and the second recess 2148 formed in the first cavity 2114. Although not shown, it should be noted that the second insert portion 2124 (shown in FIG. 21A) may include tabs that secure in recesses of the second cavity 2116 (shown in FIG. 21A) in a manner similar to what is shown in FIG. 21B. The snap fit arrangement can help to attach the outer button cover component 2112 with the inner button cover component 2120, and can be used in addition to a glue or adhesive, crush ribs, and/or other mechanical features that facilitate such an attachment.

Figure 22:
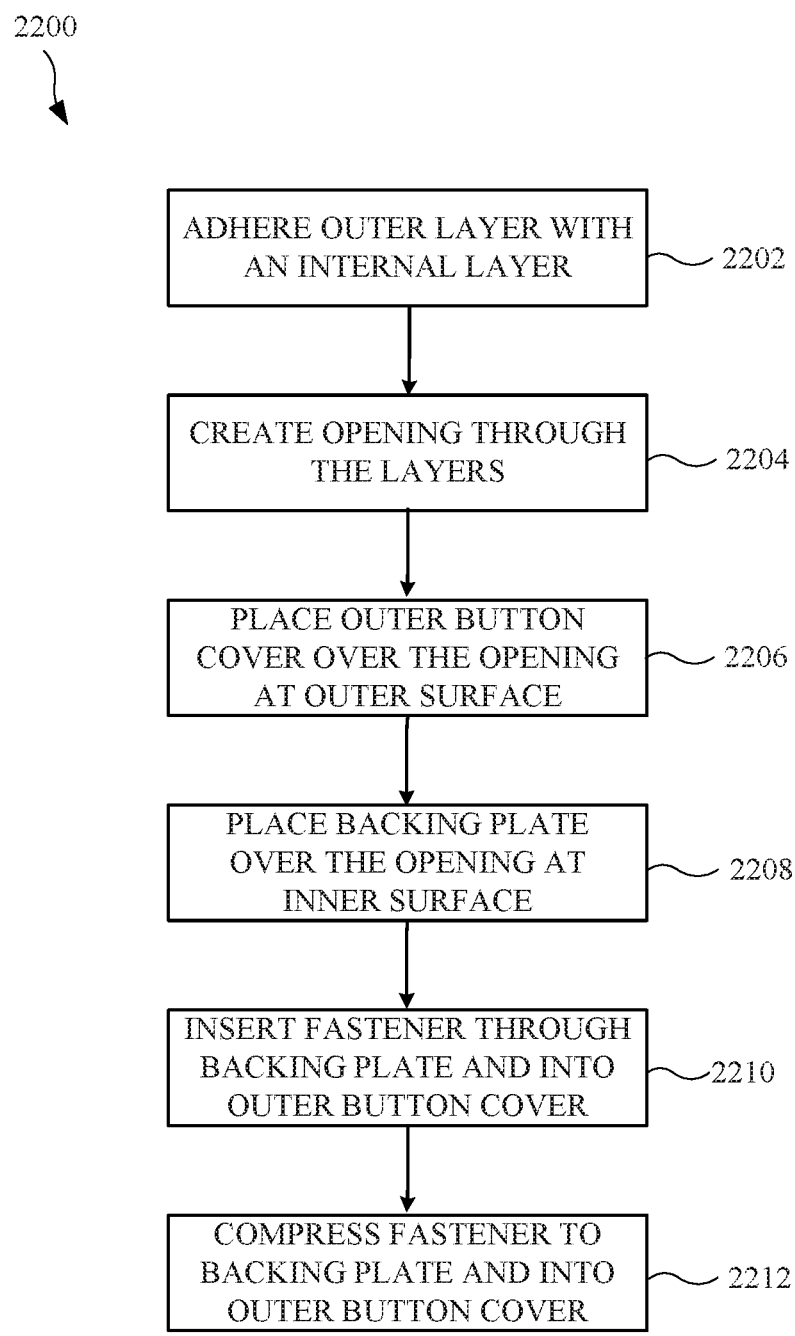
FIG. 22 illustrates a flowchart of an exemplary method for forming a protective accessory case for a portable electronic device according to various embodiments of the present disclosure.

FIG. 22 illustrates a flowchart of an exemplary method for forming a protective accessory case for a portable electronic device according to various embodiments of the present disclosure. In particular, the exemplary method involves attaching a separate outer button cover component to an accessory case. Of course, other steps and features may alternatively or also be part of forming an accessory case. The flowchart 2200 can start at a process step 2202, where layers of different materials can be adhered together. This can involve, for example, adhering an outer layer to an internal layer to form the accessory case, with the outer layer including leather or silicone, and the internal layer including a polycarbonate material. An optional microfiber lining may also be adhered to the internal layer in some embodiments. As noted above, the internal layer can be a more rigid and firm material, such as a hard plastic, while the outer layer can be a softer and aesthetically pleasing material to be handled regularly by a user, such as silicone or leather.

At process step 2204, an opening can be created through the layers of the accessory case. This opening may go through all of the layers, and can be sized for the acceptance of a button cover used to cover a button of an electronic device positioned in the accessory case. At process step 2206, an outer button cover component can be placed over the opening at an outer surface of the accessory case. In various embodiments, this outer button cover component may include anodized aluminum. In other words, the outer button cover may include a material that is different from that of the outer layer. At process step 2208, a backing plate or shim can be placed over the opening at an inner surface of the accessory case. The inner surface may also be formed from leather. Alternatively, the inner surface may include a microfiber lining at this location.

At process step 2210, a fastener can be inserted through a center opening in the backing plate and into a cavity at the rear surface of the outer button cover component. The fastener may include a self-clinching fastener, such as a PEM® fastener. At process step 2212, the fastener can be compressed against or to the backing place and into the cavity of the outer button cover component. This can result in an interference fit between the fastener and the outer button cover component, such as where one or both of the fastener and the outer button cover component deform and press into each other. Further, the edge of one of the layers of the accessory case can be compressed between the backing plate and the back of the outer button cover component as a result of compression step at process step 2212. In addition, the backing plate can be compressed between the fastener and the back of the outer button cover component at another location. The overall result is that the button cover is now affixed to the at least one of the layers of the accessory case.

It should be noted that not every step in the flowchart 2200 is always necessary, and that further steps not set forth herein may also be included. For example, added process steps that involve cutting or shaping the accessory case may be included. Also, steps that provide a camera opening may also be included. Furthermore, the exact order of steps may be altered as desired, and some steps may be performed simultaneously.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An accessory case for an electronic device, the accessory case comprising:
    a structural shell having a size and shape to receive the electronic device, the structural shell having a first opening;
    a layer that covers an outer surface of the structural shell, the layer comprising a second opening aligned with the first opening, wherein the first opening and the second opening define a through hole; and
    a button positioned at least partially in the through hole, the button comprising:
        a first button component comprising a cavity,
        a second button component at least partially positioned in the cavity, and
        a button base component separate from the first button component, wherein the first button component and the button base component surround the second button component.

2. The accessory case of claim 1, wherein the layer comprises silicone, and wherein the first button component comprises a metal.

3. The accessory case of claim 2, wherein:
    the second button component comprises a flange; and
    the first button component covers the flange.

4. The accessory case of claim 1, wherein the layer comprises leather, and wherein the first button component comprises a metal.

5. The accessory case of claim 1, wherein the button base component is positioned in the through hole, and wherein the first button cover component and the second button component are at least partially external with respect to the through hole.

6. The accessory case of claim 1, wherein:
    the layer comprises a first thickness,
    the layer comprises a web region having a second thickness less than the first thickness, and
    the first button component and the button base component engage the layer at the web region.

7. The accessory case of claim 1, wherein the button comprises a backing plate, wherein the layer is compressed between the first button component and the backing plate.

8. The accessory case of claim 7, wherein:
    the layer comprises a first thickness,
    the layer comprises a web region having a second thickness less than the first thickness, and
    the button further comprises a fastener that attaches the first button component to the layer at the web region.

9. The accessory case of claim 8, wherein the first button component includes a cavity, wherein the outer button at least partially receives the fastener at the cavity.

10. An accessory case for carrying an electronic device, the accessory case comprising:
    a bottom wall and sidewalls that define an internal volume that receives the electronic device, the sidewalls comprising a sidewall having an opening;
    a button cover positioned in the opening, the button cover comprising:
        an outer button cover component,
        an inner button cover component coupled with, and covered by, the outer button cover component, the inner button cover component comprising a protrusion, and
        a button cover base comprising a recess, wherein the button cover base is coupled with the inner button cover component when the protrusion is positioned in the recess.

11. The accessory case of claim 10, wherein the sidewall comprises:
    a first layer having a first opening; and
    a second layer having a second opening aligned with the first opening, wherein the button cover base is positioned in the first opening and the second opening.

12. The accessory case of claim 11, wherein the first layer comprises:
    a web region having a first thickness; and
    a second region surrounding the web region, the second region comprising a second thickness different from the first thickness.

13. The accessory case of claim 12, wherein the second thickness is greater than the first thickness.

14. The accessory case of claim 12, further comprising a flange region extending from the web region.

15. The accessory case of claim 14, wherein the flange region includes a third thickness that is less than the first thickness.

16. The accessory case of claim 11, wherein the first layer comprises an exterior layer comprising a non-metal, and wherein the outer button cover component comprises a metal.

17. The accessory case of claim 10, wherein the outer button cover component comprises a metal.

18. The accessory case of claim 10, wherein the inner button cover component comprises a flange region, and wherein the outer button cover component wraps around the flange region.

19. The accessory case of claim 10, wherein the bottom wall comprises:
    a layer covering an outer surface of the bottom wall and the sidewalls;
    a through hole that defines an opening in the sidewall and the layer; and
    an accessory trim surrounding the through hole, wherein the accessory trim is flush with respect to the layer.

20. The accessory case of claim 19, wherein the accessory trim comprises:

a first ring; and
a second ring secured with the first ring.

\* \* \* \* \*